United States Patent
Gu et al.

(10) Patent No.: US 12,163,001 B2
(45) Date of Patent: Dec. 10, 2024

(54) ION EXCHANGE MEMBRANE THROUGH UV INITIATION POLYMERIZATION

(71) Applicant: Evoqua Water Technologies LLC, Pittsburgh, PA (US)

(72) Inventors: George Gu, Andover, MA (US); Simon P. Dukes, Chelmsford, MA (US); Savvas Hadjikyriacou, Tyngsboro, MA (US); Michael Shaw, Derry, NH (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 668 days.

(21) Appl. No.: 17/280,179

(22) PCT Filed: Sep. 25, 2019

(86) PCT No.: PCT/US2019/052880
§ 371 (c)(1),
(2) Date: Mar. 25, 2021

(87) PCT Pub. No.: WO2020/068925
PCT Pub. Date: Apr. 2, 2020

(65) Prior Publication Data
US 2021/0340343 A1    Nov. 4, 2021

Related U.S. Application Data

(60) Provisional application No. 62/861,608, filed on Jun. 14, 2019, provisional application No. 62/736,176, (Continued)

(51) Int. Cl.
*C08J 5/22*    (2006.01)
*B01D 61/42*    (2006.01)
(Continued)

(52) U.S. Cl.
CPC .......... *C08J 5/2243* (2013.01); *B01D 61/422* (2013.01); *B01D 67/00931* (2022.08);
(Continued)

(58) Field of Classification Search
CPC ...... C08J 5/2243; C08J 5/2275; C08J 5/2287; C08J 2323/06; B01D 61/422;
(Continued)

(56) References Cited

U.S. PATENT DOCUMENTS 2,780,604 A    2/1957   Clarke et al.
3,009,895 A   11/1961   Slocombe
(Continued)

FOREIGN PATENT DOCUMENTS

CN    1114237 A    1/1996
CN    1986613 A    6/2007
(Continued)

OTHER PUBLICATIONS

Christmas, Byron K. Idacavage, Mike J . . . (2023). Section 4.10 of "Photopolymerization-Fundamental Polymer Chemistry & Industrial Applications." DEStech Publications. Retrieved from: https://app.knovel.com/hotlink/toc/id:kpPFPCIA07/photopolymerization-fundamental/photopolymerization-fundamental (Year: 2023).*
(Continued)

*Primary Examiner* — Christina H.W. Rosebach

(57) ABSTRACT

Methods of producing an ion exchange membrane support are disclosed. The methods include saturating a polymeric microporous substrate with a charged monomer solution comprising at least one functional monomer, a cross-linking agent, and an effective amount of at least one photopolymerization initiator and polymerizing the at least one functional monomer by exposing the saturated polymeric microporous substrate to ultraviolet light under conditions effective to cross-link the at least one functional monomer
(Continued)

and produce the ion exchange membrane support. Methods of producing a monovalent selective ion exchange membrane are also disclosed. The methods include functionalizing an exterior surface of the ion exchange membrane support with a charged compound layer, drying the ion exchange membrane support and soaking the ion exchange membrane support in a solution comprising an acid or a base for an amount of time effective to produce the monovalent selective ion exchange membrane.

27 Claims, 8 Drawing Sheets

Related U.S. Application Data filed on Sep. 25, 2018, provisional application No. 62/737,373, filed on Sep. 27, 2018.

(51) Int. Cl.
| | |
|---|---|
| B01D 67/00 | (2006.01) |
| B01D 69/02 | (2006.01) |
| B01D 69/10 | (2006.01) |
| B01D 69/12 | (2006.01) |
| B01D 71/26 | (2006.01) |
| B01D 71/60 | (2006.01) |
| C02F 1/469 | (2023.01) |
| B01D 61/44 | (2006.01) |
| C08K 5/132 | (2006.01) |
| C08K 5/315 | (2006.01) |
| C08K 5/5397 | (2006.01) |

(52) U.S. Cl.
CPC .......... *B01D 69/02* (2013.01); *B01D 69/105* (2013.01); *B01D 69/107* (2022.08); *B01D 69/125* (2013.01); *B01D 71/261* (2022.08); *B01D 71/262* (2022.08); *B01D 71/60* (2013.01); *C02F 1/4693* (2013.01); *B01D 61/44* (2013.01); *B01D 67/009* (2013.01); *B01D 2323/30* (2013.01); *B01D 2323/32* (2013.01); *B01D 2323/345* (2013.01); *B01D 2323/36* (2013.01); *B01D 2323/40* (2013.01); *B01D 2325/02834* (2022.08); *B01D 2325/04* (2013.01); *B01D 2325/14* (2013.01); *B01D 2325/16* (2013.01); *B01D 2325/20* (2013.01); *B01D 2325/26* (2013.01); *B01D 2325/34* (2013.01); *B01D 2325/42* (2013.01); *C08J 2323/06* (2013.01); *C08K 5/132* (2013.01); *C08K 5/315* (2013.01); *C08K 5/5397* (2013.01)

(58) Field of Classification Search
CPC ........ B01D 61/44; B01D 69/02; B01D 69/10; B01D 69/105; B01D 69/125; B01D 71/28; B01D 71/26; B01D 71/60; B01D 67/009; B01D 67/0093; B01D 2323/30; B01D 2323/32; B01D 2323/345; B01D 2323/36; B01D 2323/40; B01D 2325/02; B01D 2325/04; B01D 2325/14; B01D 2325/16; B01D 2325/20; B01D 2325/26; B01D 2325/34; B01D 2325/42; B01D 69/106; C08K 5/132; C08K 5/315; C08K 5/5397
See application file for complete search history.

(56) References Cited

U.S. PATENT DOCUMENTS

| | | |
|---|---|---|
| 3,549,016 A | 12/1970 | Rigopulos |
| 3,647,086 A | 3/1972 | Mizutani et al. |
| 3,737,045 A | 6/1973 | Hashimoto et al. |
| 3,926,864 A | 12/1975 | Hodgdon, Jr. |
| 4,042,496 A | 8/1977 | Tsushima et al. |
| 4,231,855 A | 11/1980 | Hodgdon et al. |
| 4,297,431 A | 10/1981 | Sullivan |
| 4,585,833 A | 4/1986 | Domeier |
| 4,704,324 A | 11/1987 | Davis et al. |
| 4,778,601 A | 10/1988 | Lopatin et al. |
| 4,797,187 A | 1/1989 | Davis et al. |
| 4,828,772 A | 5/1989 | Lopatin et al. |
| 4,874,567 A | 10/1989 | Lopatin et al. |
| 4,933,405 A | 6/1990 | Evani |
| 5,032,274 A | 7/1991 | Yen et al. |
| 5,039,420 A | 8/1991 | Klein et al. |
| 5,118,717 A | 6/1992 | Hodgdon et al. |
| 5,120,632 A | 6/1992 | Bertrand et al. |
| 5,145,618 A | 9/1992 | MacDonald et al. |
| 5,194,189 A | 3/1993 | Papastavros et al. |
| 5,264,125 A | 11/1993 | MacDonald et al. |
| 5,380,413 A | 1/1995 | Posar et al. |
| 5,389,449 A | 2/1995 | Afeyan et al. |
| 5,401,408 A | 3/1995 | Umemura et al. |
| 5,447,636 A | 9/1995 | Banerjee |
| 5,510,394 A | 4/1996 | Hodgdon |
| 5,547,551 A | 8/1996 | Bahar et al. |
| 5,599,614 A | 2/1997 | Bahar et al. |
| 5,635,041 A | 6/1997 | Bahar et al. |
| 5,714,521 A | 2/1998 | Kedem et al. |
| 5,814,197 A | 9/1998 | Batchelder et al. |
| 5,840,192 A | 11/1998 | El Moussaoui et al. |
| 5,849,167 A | 12/1998 | Posar |
| 5,868,976 A | 2/1999 | Puglia et al. |
| 5,928,575 A * | 7/1999 | Buazza ............ B29D 11/00009 |
| | | 264/2.6 |
| 5,961,796 A | 10/1999 | Hitchens et al. |
| 5,985,942 A | 11/1999 | Steck et al. |
| 6,013,724 A | 1/2000 | Mizutani et al. |
| 6,110,333 A | 8/2000 | Spethmann et al. |
| 6,117,297 A | 9/2000 | Goldstein |
| 6,217,733 B1 | 4/2001 | Hurwitz et al. |
| 6,221,248 B1 | 4/2001 | Lin et al. |
| 6,254,978 B1 | 7/2001 | Bahar et al. |
| 6,258,276 B1 | 7/2001 | Mika et al. |
| 6,277,512 B1 | 8/2001 | Hamrock et al. |
| 6,344,584 B2 | 2/2002 | Lin et al. |
| 6,368,486 B1 | 4/2002 | Thompson et al. |
| 6,410,672 B1 | 6/2002 | MacDonald et al. |
| 6,423,205 B1 | 7/2002 | Akahori et al. |
| 6,596,137 B2 | 7/2003 | Nago et al. |
| 6,689,501 B2 | 2/2004 | Stone et al. |
| 6,723,758 B2 | 4/2004 | Stone et al. |
| 6,814,865 B1 | 11/2004 | Aminabhavi et al. |
| 6,828,386 B2 | 12/2004 | MacKinnon |
| 6,830,671 B2 | 12/2004 | Aritomi et al. |
| 6,849,688 B2 | 2/2005 | Hellums |
| 6,851,561 B2 | 2/2005 | Wu et al. |
| 6,924,318 B2 | 8/2005 | Mischi et al. |
| 7,081,484 B2 | 7/2006 | Sugaya et al. |
| 7,087,654 B2 | 8/2006 | MacDonald et al. |
| 7,201,832 B2 | 4/2007 | Yamanaka et al. |
| 7,226,646 B2 | 6/2007 | McLean et al. |
| 7,247,370 B2 | 7/2007 | Childs et al. |
| 7,316,919 B2 | 1/2008 | Childs et al. |
| 7,318,972 B2 | 1/2008 | Highgate |
| 7,368,200 B2 | 5/2008 | Zhu et al. |
| 7,396,465 B2 | 7/2008 | Wu et al. |
| 7,425,583 B2 | 9/2008 | Inoue et al. |
| 7,449,111 B2 | 11/2008 | Hedhli et al. |
| 7,514,481 B2 | 4/2009 | Yandrasits et al. |
| 7,537,852 B2 | 5/2009 | Hamamoto et al. |
| 7,544,278 B2 | 6/2009 | Aminabhavi et al. |
| 7,550,216 B2 | 6/2009 | Ofer et al. |
| 7,632,406 B2 | 12/2009 | Wilson et al. |

(56) References Cited

U.S. PATENT DOCUMENTS

| | | | |
|---|---|---|---|
| 7,649,025 B2 | 1/2010 | Kitamura et al. | |
| 7,674,505 B2 | 3/2010 | Kerres et al. | |
| 7,740,967 B2 | 6/2010 | Oren et al. | |
| 7,790,837 B2 | 9/2010 | McGrath et al. | |
| 7,829,218 B2 | 11/2010 | Endo et al. | |
| 7,833,644 B2 | 11/2010 | Chokai et al. | |
| 7,868,124 B2 | 1/2011 | Balland-Longeau et al. | |
| 7,888,397 B1 | 2/2011 | Hibbs et al. | |
| 7,893,303 B2 | 2/2011 | Yamakawa et al. | |
| 7,901,831 B2 | 3/2011 | Brunea | |
| 7,910,236 B2 | 3/2011 | Hommura et al. | |
| 7,923,166 B2 | 4/2011 | Fukuta et al. | |
| 7,931,995 B2 | 4/2011 | Bahar et al. | |
| 7,938,941 B2 | 5/2011 | Kashiwada et al. | |
| 7,947,196 B2 | 5/2011 | Lee et al. | |
| 7,959,780 B2 | 6/2011 | Hawkins et al. | |
| 7,968,663 B2 | 6/2011 | MacDonald et al. | |
| 7,977,392 B2 | 7/2011 | MacKinnon et al. | |
| 8,075,951 B2 | 12/2011 | Hammond-Cunningham et al. | |
| 8,114,550 B2 | 2/2012 | Suzuki et al. | |
| 8,349,155 B2 | 1/2013 | Umemura et al. | |
| 8,367,267 B2 | 2/2013 | Frey et al. | |
| 8,703,831 B2 | 4/2014 | Lin et al. | |
| 8,969,424 B2 | 3/2015 | Lin | |
| 9,023,902 B2* | 5/2015 | Lin | C08J 5/2225 521/27 |
| 9,751,050 B2 | 9/2017 | Zhou et al. | |
| 2002/0019448 A1 | 2/2002 | Sugaya et al. | |
| 2002/0045085 A1 | 4/2002 | Formato et al. | |
| 2003/0024816 A1 | 2/2003 | Aritomi et al. | |
| 2003/0105173 A1 | 6/2003 | Sugaya et al. | |
| 2004/0175625 A1 | 9/2004 | Hedhli et al. | |
| 2004/0241518 A1 | 12/2004 | Yang | |
| 2005/0011826 A1 | 1/2005 | Childs et al. | |
| 2005/0250919 A1 | 11/2005 | Caneba et al. | |
| 2006/0000778 A1 | 1/2006 | Childs et al. | |
| 2006/0045985 A1 | 3/2006 | Kozak | |
| 2007/0020499 A1 | 1/2007 | Suzuki et al. | |
| 2007/0031716 A1 | 2/2007 | Rajendran | |
| 2007/0261962 A1 | 11/2007 | Gajek | |
| 2008/0023334 A1 | 1/2008 | Nakagawa et al. | |
| 2008/0223785 A1 | 9/2008 | Miller et al. | |
| 2009/0137757 A1 | 5/2009 | Imuta et al. | |
| 2009/0155370 A1 | 6/2009 | Cope et al. | |
| 2010/0056650 A1 | 3/2010 | Highgate | |
| 2010/0062313 A1 | 3/2010 | Browning et al. | |
| 2010/0065490 A1 | 3/2010 | Balster et al. | |
| 2010/0239946 A1 | 9/2010 | Miyachi et al. | |
| 2011/0020730 A1 | 1/2011 | Mizuno et al. | |
| 2011/0068002 A1 | 3/2011 | Lin et al. | |
| 2011/0091698 A1* | 4/2011 | Zhou | B01D 69/12 427/510 |
| 2011/0097645 A1 | 4/2011 | Van Baak et al. | |
| 2011/0132762 A1 | 6/2011 | O' Brien et al. | |
| 2011/0147308 A1 | 6/2011 | Johnston-Hall et al. | |
| 2011/0189585 A1 | 8/2011 | Brunea | |
| 2011/0200907 A1 | 8/2011 | Moon et al. | |
| 2011/0203990 A1 | 8/2011 | Murphy et al. | |
| 2011/0224314 A1 | 9/2011 | MacDonald et al. | |
| 2011/0281197 A1 | 11/2011 | Daikoku et al. | |
| 2011/0290727 A1* | 12/2011 | Van Engelen | B01D 69/125 429/491 |
| 2012/0006685 A1 | 1/2012 | Van Engelen | |
| 2012/0014858 A1 | 1/2012 | Rowell | |
| 2012/0024697 A1 | 2/2012 | Antheunis et al. | |
| 2012/0031834 A1 | 2/2012 | Higa et al. | |
| 2012/0035280 A1 | 2/2012 | Jikihara et al. | |
| 2012/0248028 A1 | 10/2012 | Antheunis et al. | |
| 2012/0248029 A1 | 10/2012 | Antheunis et al. | |
| 2012/0248030 A1 | 10/2012 | Antheunis et al. | |
| 2012/0248032 A1 | 10/2012 | Van Berchum et al. | |
| 2012/0312688 A1* | 12/2012 | Berthelot | C08J 5/2243 204/520 |
| 2012/0329891 A1 | 12/2012 | Lee et al. | |
| 2013/0317128 A1 | 11/2013 | Lin | |
| 2014/0166488 A1* | 6/2014 | Lin | C08J 5/2225 521/27 |
| 2016/0236952 A1 | 8/2016 | Ikeda | |
| 2017/0240439 A1 | 8/2017 | Lin | |

FOREIGN PATENT DOCUMENTS

| | | | |
|---|---|---|---|
| CN | 102040694 A | 5/2011 | |
| EP | 0229451 A1 | 7/1987 | |
| EP | 2333887 A1 | 6/2011 | |
| JP | 63-503074 A | 11/1988 | |
| JP | 2000-503898 A | 4/2000 | |
| JP | 2001-157823 A | 6/2001 | |
| JP | 2003-277421 A1 | 10/2003 | |
| JP | 2005-334263 A | 12/2005 | |
| JP | 2006-519273 A | 8/2006 | |
| JP | 2008119608 A | 5/2008 | |
| JP | 2008-255351 A | 10/2008 | |
| JP | 2008288065 A | 11/2008 | |
| JP | 2009144041 A | 7/2009 | |
| JP | 2009-173786 A | 8/2009 | |
| JP | 2009-173828 A | 8/2009 | |
| JP | 2009-215499 A | 9/2009 | |
| JP | 2009-215500 A | 9/2009 | |
| JP | 2014-201612 A | 10/2014 | |
| JP | 2013-503038 A1 | 7/2016 | |
| JP | 7-330815 B2 | 8/2023 | |
| KR | 10-2012-0059585 A | 6/2012 | |
| WO | 0193361 A2 | 12/2001 | |
| WO | 03008078 A2 | 1/2003 | |
| WO | 2004073843 A1 | 9/2004 | |
| WO | 2005102503 A1 | 11/2005 | |
| WO | WO-2007018425 A1 * | 2/2007 | ......... B01D 67/0006 |
| WO | 2010007399 A1 | 1/2010 | |
| WO | 2010013861 A1 | 2/2010 | |
| WO | 2010106356 A1 | 9/2010 | |
| WO | 2010106357 A1 | 9/2010 | |
| WO | 2011-025867 A1 | 3/2011 | |
| WO | 2012051608 A1 | 4/2012 | |
| WO | 2012051610 A1 | 4/2012 | |
| WO | 2012081026 A2 | 6/2012 | |
| WO | 2013014420 A1 | 1/2013 | |
| WO | 2013052227 A1 | 4/2013 | |
| WO | WO-2014113065 A1 * | 7/2014 | ........... B01D 63/081 |
| WO | 2015-068797 A1 | 5/2015 | |
| WO | 2016-027595 A1 | 2/2016 | |
| WO | 2016028972 A1 | 2/2016 | |

OTHER PUBLICATIONS

Wakita, Hiroyasu, "Notice of Reasons for Refusal", Japanese Patent Application No. 2021-510358, mailed Aug. 10, 2023, 17 pages.

Levy, Meytal Avisar, "Notice of Deficiencies", Israeli Patent Application No. 281681, mailed Sep. 20, 2023, 5 pages.

Sata, T. et al., "Modification of transport properties of ion exchange membranes, X: formation of polyethyleneimine layer on cation exchange membrane by acid-amide bond", Die Angewandte Makromolekulare Chemie, vol. 171, No. 2794, 1989, pp. 101-117.

Pamies Olle, Silvia, "Extended European Search Report" issued for related European Patent Application No. 19865282.8, mailed Jun. 7, 2022, 9 pages.

"First Office Action", issued by the China National Intellectual Property Administration regarding related Chinese patent application No. 201980062447.2 mailed Jul. 20, 2022, 18 pages.

J.C. Salamone et al: "Polymerization of Vinylpyridinium Salts. XIII. Preparation of CVinyl-N-Methylpyridinium pStyrenesulfonate Charge Transfer Ion-Pair Comonomer", Dec. 31, 1985 (Dec. 31, 1985), XP055104794, Retrieved from the Internet: URL:http://onlinelibrary.wiley.com/store/10.1002/pol.1985.130231210/asset/130231210_ftp.pdf?v-1&t-hs6a53wy&s-e4772bb8729bf774cd920c40734d5b18cad056d1 [retrieved on Feb. 27, 2014] *p. 656, paragraph 7* *p. 658, paragraph 3*.

Mihalick. "Chapter 5: Structure of Polymers." University of Washington Oshkosh, Jun. 26, 2013.

Pandey, Ashok K. et al., "Formation of Pore-Filled Ion-Exchange Membranes within Situ Crosslinking: Poly (Vinylbenzyl Ammo-

(56) References Cited

OTHER PUBLICATIONS nium Salt)-Filled Membranes", Journal of Polymer Science Part A: Polymer Chemistry, vol. 39, No. 6, Mar. 15, 2001.
PubChem. "1-Methyl-2-Pyrrolidinone." National Center for Biotechnology Information. PubChem Compound Database, U.S. National Library of Medicine, 2015.
TGSC. "Sulfoethyl Methacrylate." The Good Scents Company—Aromatic/Hydrocarbon/Inorganic Ingredients Catalog Information, The Good Scents Company, Dec. 2, 2016.
Yang, Xinmeng, Decision of Rejection, Chinese Patent Application No. 201980062072.X, mailed Jul. 16, 2024, 12 pages.
Unknown, "Notice to Submit Response", South Korean Patent Application No. 10-2021-7012359, mailed Jul. 16, 2024, 14 pages.
Levy, Meytal A., "Notice of Deficiencies", Israeli Patent Application No. 31099, mailed Sep. 18, 2024, 5 pages.
Silva, Benjamin, "Examination Report No. 1", Australian Patent Application No. 2019346436, mailed Aug. 30, 2024 4 pages.

\* cited by examiner

ION EXCHANGE MEMBRANE THROUGH UV INITIATION POLYMERIZATION

CROSS-REFERENCE TO RELATED APPLICATIONS

This application claims priority under 35 U.S.C. § 119(e) to U.S. Provisional Application Ser. No. 62/736,176 titled "Cation Exchange Membrane Through UV Initiated Polymerization" filed Sep. 25, 2018, U.S. Provisional Application Ser. No. 62/861,608 titled "Exchange Membrane Preparation by UV Light Polymerization" filed Jun. 14, 2019, and U.S. Provisional Application Ser. No. 62/737,373 titled "Monovalent Selective Cation Exchange Membrane" filed Sep. 27, 2018, each of which is incorporated herein by reference in its entirety for all purposes.

FIELD OF TECHNOLOGY

Aspects and embodiments disclosed herein are generally related to ion exchange membranes, and more specifically, to ion exchange membranes photoinitiated by UV light polymerization.

SUMMARY

In accordance with one aspect, there is provided a method of producing an ion exchange membrane support. The method may comprise saturating a polymeric microporous substrate having a thickness between 25 µm and 55 µm with a charged monomer solution comprising at least one functional monomer, a cross-linking agent, and an effective amount of at least one photopolymerization initiator. The method may comprise polymerizing the at least one functional monomer by exposing the saturated polymeric microporous substrate to ultraviolet light in a substantially oxygen free environment at room temperature for an amount of time effective to cross-link the at least one functional monomer and produce the ion exchange membrane support.

In some embodiments, the at least one photopolymerization initiator may comprise at least one of 1-hydroxycyclohexyl phenyl ketone, phenyl bis(2,4,6-trimethylbenzoyl) phosphine oxide, bis-acylphosphinoxide, 2-hydroxy-2-methylpropiophenone, 2,2'-azobisisobutyronitrile, and 2,2-dimethoxy-2-phenyl-acetophene.

The effective amount may be between about 2% w/w and 5% w/w.

The effective amount may be about 2% w/w and the amount of time effective to cross-link the at least one functional monomer may be between about 20 seconds and about 30 seconds.

The method may comprise producing a cation exchange membrane support. The at least one functional monomer may comprise at least one of 2-sulfoethylmethacrylate (2-SEM), 2-acrylamide-2-methyl propane sulfonic acid (AMPS), sulfonated glycidylmethacrylate, 3-sulfopropyl methacrylate, sodium 1-allyloxy-2 hydroxypropyl sulfonate, acrylic and methacrylic acid or their salts, sodium styrene sulfonate, styrene sulfonic acid, sulfonated vinylbenzyl chloride sodium 1-allyloxy-2 hydroxypropyl sulfonate, 4-Vinylbenzoic acid, Trichloroacrylic acid, vinyl phosphoric acid, and vinyl sulfonic acid.

The method may comprise producing an anion exchange membrane support. The at least one functional monomer may comprise at least one of methacrylamidopropyltrimethyl ammonium chloride; trimethylammoniumethylmethacrylate; quaternary salts of polyamines and vinylaromatic halides; quaternary salts formed by reacting cyclic ethers, polyamines, and alkyl halides; vinylbenzyltrimethylammonium chloride; trimethylammoniumethylmethacrylic chloride; 3-(acrylamidopropyl)trimethylammonium chloride; N,N,N',N',N"-pentamethyldiethylenetriamine di(vinylbenzyl chloride); Glycidyl methacrylate/trimethylamine; and Glycidyl methacrylate/N,N-dimethylethylenediamine reaction product.

The method may comprise functionalizing an exterior surface of the ion exchange membrane support with a charged compound layer, drying the functionalized ion exchange membrane support, and soaking the functionalized ion exchange membrane support in a solution comprising an acid or a base for an amount of time effective to produce the monovalent selective ion exchange membrane.

In some embodiments, the ion exchange membrane may have a premselectivity of at least 90% and a resistance of less than 2 $\Omega$-cm$^2$.

The cross-linking agent may comprise at least one of divinyl benzene (DVB) and ethylene glycol dimethacrylate (EGDM).

In accordance with another aspect, there is provided another method of producing an ion exchange membrane support. The method may comprise saturating a polymeric microporous substrate with a charged monomer solution comprising at least one functional monomer, a cross-linking agent, and an effective amount of at least one photopolymerization initiator. The method may comprise polymerizing the at least one functional monomer by exposing the saturated polymeric microporous substrate to ultraviolet light in a substantially oxygen free environment at an intensity effective to penetrate the substrate and for an amount of time effective to cross-link the at least one functional monomer and produce the ion exchange membrane support.

In some embodiments, the method may comprise exposing the saturated polymeric microporous substrate to ultraviolet light having an intensity between about 2000 mW/cm$^2$ and about 2200 mW/cm$^2$ for an amount of time between about 1 second and about 5 seconds.

In some embodiments, the method may comprise exposing the saturated polymeric microporous substrate to ultraviolet light having an intensity between about 200 mW/cm$^2$ and about 500 mW/cm$^2$ for an amount of time between about 20 seconds and about 30 seconds.

In some embodiments, the method may comprise exposing the saturated polymeric microporous substrate to ultraviolet light having an intensity between about 500 mW/cm$^2$ and about 2000 mW/cm$^2$ for an amount of time between about 5 seconds and about 20 seconds. The method may comprise exposing the saturated polymeric microporous substrate to ultraviolet light on a top and bottom surface.

In some embodiments, the method may comprise exposing the saturated polymeric microporous substrate to ultraviolet light having an intensity between about 200 mW/cm$^2$ and about 500 mW/cm$^2$ on each of the top and bottom surface.

The method may comprise pulsating the ultraviolet light.

The method may comprise exposing the saturated polymeric microporous substrate to ultraviolet light having an intensity between about 2000 mW/cm$^2$ and about 2200 mW/cm$^2$.

In some embodiments, the at least one photopolymerization initiator may comprise at least one of 1-hydroxycyclohexyl phenyl ketone, phenyl bis(2,4,6-trimethylbenzoyl) phosphine oxide, bis-acylphosphinoxide, 2-hydroxy- 2-methylpropiophenone, 2,2'-azobisisobutyronitrile, and 2,2-dimethoxy-2-phenyl-acetophene.

The method may comprise exposing the saturated polymeric microporous substrate to ultraviolet light having a wavelength effective to photoinitiate the at least one photopolymerization initiator.

The wavelength may be effective to photoinitiate the at least one photopolymerization initiator is between about 245 nm and about 420 nm.

The charged monomer solution may comprise at least two photopolymerization initiators.

In some embodiments, each of the at least two photopolymerization initiators may be configured to photoinitiate at different wavelengths.

In accordance with yet another aspect, there is provided a method of producing a monovalent selective ion exchange membrane. The method may comprise saturating a polymeric microporous substrate having a thickness between 25 μm and 55 μm with a charged monomer solution comprising at least one functional monomer, a cross-linking agent, and an effective amount of at least one photopolymerization initiator. The method may comprise polymerizing the at least one functional monomer by exposing the saturated polymeric microporous substrate to ultraviolet light in a substantially oxygen free environment at room temperature for an amount of time effective to cross-link the at least one functional monomer and produce an ion exchange membrane support. The method may comprise functionalizing an exterior surface of the ion exchange membrane support with a charged compound layer. The method may comprise drying the functionalized ion exchange membrane support. The method may comprise soaking the functionalized ion exchange membrane support in a solution comprising an acid or a base for an amount of time effective to produce the monovalent selective ion exchange membrane.

The method may comprise soaking the functionalized ion exchange membrane support in a solution comprising 1N NaOH for about 15 minutes.

The method may further comprise rinsing the monovalent selective ion exchange membrane with water and conditioning the monovalent selective ion exchange membrane in a solution comprising 0.5M NaCl.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
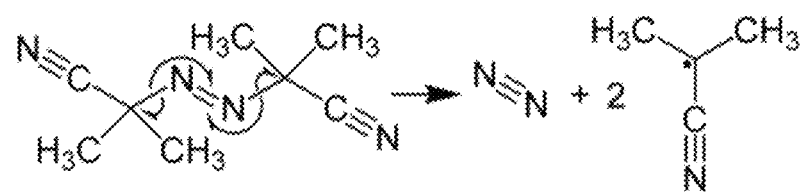
FIG. 1 is a representation of the thermal decomposition of AIBN.

Embodiments disclosed herein provide for ion exchange membranes and processes for their manufacture. The electrodialysis membranes described herein may generally combine low resistance and high permselectivity. Their properties may make them highly effective in water desalination applications, particularly in seawater desalination. The ion exchange membranes described herein may be manufactured by polymerizing one or more monofunctional ionogenic monomers, optionally a neutral monomer with at least one multifunctional monomer, in the pores of a porous substrate.

Ion exchange membranes are typically employed to transport cations or anions under an electrical or chemical potential. Ion exchange membranes may have either negatively or positively charged groups attached to the polymeric material making up the bulk of the membrane. The counterion of each group typically functions as the transferable ion. A cation exchange membrane may have fixed negative charges and mobile positively charged cations. An anion exchange membrane may have fixed positively charged groups and mobile negatively charged anions. Ion exchange membrane properties may be engineered by controlling the amount, type, and distribution of the fixed ionic groups. These membranes may be described as strong acid, strong base, weak acid, or weak base membranes. Strong acid cation exchange membranes typically have sulfonic acid groups as the charged group. Weak acid membranes typically have carboxylic acid groups making up the fixed charged group. Quaternary and tertiary amines, respectively, may produce the fixed positive charged groups in strong and weak base anion exchange membranes.

Ion exchange membranes may be used for desalination of water by electrodialysis (ED), as a power generating source in reverse electrodialysis, or as separators in fuels cells. Thus, water treatment systems disclosed herein may be or comprise desalination systems, power generating systems, or reverse electrodialysis systems. Other applications include recovery of metal ions in the electroplating and metal finishing industries and applications in the food and beverage industry. In other embodiments, water treatment systems disclosed herein may be or comprise metal ion recovery systems or food and beverage processing systems.

In a particular exemplary embodiment, ion exchange membranes disclosed herein may be used for ground water treatment and/or in agricultural settings. The water treatment systems disclosed herein may be or comprise ground water treatment systems. The water treatment systems disclosed herein may be or comprise agricultural irrigation runoff treatment systems. The methods may comprise treating ground water. The methods may comprise treating agricultural water runoff.

Electrodialysis generally desalinates water by transferring ions and some charged organics through paired anion- and cation selective membranes under the motive force of a direct current voltage. An ED apparatus may include electrically conductive and substantially water impermeable anion selective and cation selective membranes arranged as opposing walls of a cell. Adjacent cells typically form a cell pair. Membrane stacks may include many, sometime hundreds, of cell pairs. An ED system may include many stacks. Each membrane stack typically has a DC (direct current) anode at one end of the stack and a DC cathode at the other end. Under a DC voltage, ions may move toward the electrode of opposite charge.

A cell pair includes two types of cells, diluting cells and concentrating cells. Each type of cell may be defined by opposing membranes. One exemplary cell pair may include a common cation transfer membrane wall and two anion transfer membrane walls forming the two cells. That is, a first anion transfer membrane and the cation transfer membrane form the diluting cell, and the cation transfer membrane and a second anion transfer membrane form the concentrating cell. In the diluting cell, cations typically pass through the cation transfer membrane facing the anode, but may be stopped by the paired anion transfer membrane of the concentrating cell in that direction facing the cathode. Similarly, anions may pass through the anion transfer membrane of the diluting cell facing the cathode, but may be stopped by the cation transfer membrane of the adjacent pair facing the anode. In this manner, salt in a diluting cell may be removed. In the adjacent concentrating cell, cations may enter from one direction and anions from the opposite direction. Flow in the stack may be arranged so that the dilute and concentrated flows are kept separate. Thus a desalinated water stream may be produced from the dilute flow.

Scarcity of irrigation water of sufficient quality is deleterious to crop yields and may require choice of crop species that are of less demand. Newer methods of irrigation that reduce the amount of water used, using techniques such as drip irrigation, may also cause a non-sustainable condition due to salt and impurity buildup in the soil from the water used for irrigation. The soil salinity may rise to much higher concentrations than in the irrigation water due to use of most of the water by the crops, and by evaporation. Conditions of irrigation and soil with inadequate source water for leaching the soil or insufficient rainfall may result in soil salinities 4 to 5 times higher than in the irrigation water itself. Further, should the land consist of relatively shallow impermeable ground layers, the irrigation water may raise the water table. When highly saline ground water reaches crop root levels, the water may be harmful to crop growth. Also, saline soils may damage leafy crops due to water splash off the soil surface. Furthermore, if the agricultural land is drained of the saline water, trace impurities in the soil such as selenium or boron, or residual contaminants from fertilizer use such as nitrate may cause contamination of the drainage water and cause difficulties in safe effluent control.

Irrigation water needs also are in competition with potable drinking water for humans, and water free of contaminants for livestock, and wildlife. Thus it is commonly the case that a source of a combination of irrigation water and potable water are needed in agricultural regions. The membranes described herein may be employed for agricultural irrigation water treatment.

Univalent selective or monovalent selective membranes primarily transfer monovalent ions. Monovalent selective membranes may separate ions on the basis of charge and/or size. Monovalent selective membranes may distinguish between monovalent and divalent ions. Monovalent selective cation transfer membranes may distinguish between ions having a charge of +1, for example, sodium and potassium, and ions having a greater positive charge, for example, magnesium and calcium. Thus, monovalent selective cation exchange membranes described herein may selectively transport monovalent ions such as sodium and potassium ions, while blocking transport of divalent ions such as calcium and magnesium ions. Similarly, monovalent selective anion membranes may separate ions having a charge of −1, such as chloride, bromide, and nitrate, from ions having a greater negative charge. Thus, monovalent anion exchange membranes described herein may selectively transport monovalent ions such as chloride and nitrate ions, while blocking transport of divalent ions such as sulfate ions.

The ion exchange membranes disclosed herein may be used to treat brackish water and waste water desalination. Even though ED is generally considered too expensive for seawater use, the ion exchange membranes disclosed herein may be used efficiently for seawater desalination. Effective and efficient seawater desalination may be performed with a membrane resistance of less than 1 $\Omega$-cm$^2$, for example, less than 0.8 $\Omega$-cm$^2$, or less than 0.5 $\Omega$-cm$^2$. The ion exchange membranes disclosed herein may also provide an ion permselectivity of greater than 90%, for example, greater than 95%, or greater than 98%. Additionally, the ion exchange membranes disclosed herein have a longer service life and greater physical strength and chemical durability than comparable conventional ion exchange membranes. Finally, the ion exchange membranes disclosed herein may be manufactured at a comparatively low cost.

As a result, the ion exchange membranes disclosed herein may be employed in reverse electrodialysis (RED). RED may be used to convert free energy generated by mixing two aqueous solutions of different salinities into electrical power. In general, the greater the difference in salinity, the greater the potential for power generation. The water treatment systems disclosed herein may be or comprise RED systems. The methods disclosed herein may be employed to generate electrical power.

The ion exchange membranes disclosed herein may be employed as a polymer electrolyte membrane (PEM). A PEM is a type of ion exchange membrane that may serve both as the electrolyte and as a separator to prevent direct physical mixing of the hydrogen from the anode and oxygen supplied to the cathode. A PEM may contain negatively charged groups, such as, sulfonic acid groups, attached or as part of the polymer making up the PEM. Protons typically migrate through the membrane by jumping from one fixed negative charge to another to permeate the membrane.

The membranes disclosed herein may generally comprise an ion exchange membrane support and a charged functionalizing layer covalently bound to the ion exchange membrane support. The ion exchange membrane support may comprise a polymeric microporous substrate and a cross-linked ion-transferring polymeric layer on a surface of the substrate. As an intermediate production step, the membrane support may additionally comprise an amine group layer covalently bound to the cross-linked ion-transferring polymeric layer. The charged functionalizing layer is a positively charged functionalizing layer comprising at least one of a sulfonic acid group, a carboxylic acid group, a quaternary ammonium, and a tertiary amine group hydrolyzed into a positively charged ammonium.

The membranes described herein may generally exhibit good mechanical strength. The mechanical strength may be sufficient to allow the membrane to withstand the stresses of a continuous membrane manufacturing process, and be fabricated and sealed into the final membrane-holding device or module without overt damage or hidden damage which could appear after some time of operation. In addition, the mechanical strength may be sufficient to provide high dimensional stability. The membrane may generally exhibit minimal variation in dimensions while working as a desalination apparatus, during cleaning, sanitizing or defouling regimes, or during shipping or while in storage. High dimensional stability to changes in ionic content or temperature, for example, of the fluid contacting the membrane, may be provided, such that during operation variations in the distance between membrane pairs which could lead to current inefficiencies are minimized. Changes in dimensions during electrodialysis which could cause stresses in the constrained membrane leading to membrane defects and poor performance, may also generally be minimized.

The membranes described herein may exhibit low resistance. In general, low resistance reduces the electrical energy required to desalinate and lowers operating cost. Specific membrane resistance is typically measured in $\Omega$-cm. A more convenient engineering measure is $\Omega$-cm$^2$. Resistance may be measured by a resistance testing process which uses a cell having two electrodes of known area in an electrolyte solution. Platinum or black graphite are typically used for the electrodes. Resistance is then measured between the electrodes. A membrane sample of known area may be positioned between the electrodes in the electrolyte solution. The electrodes do not touch the membrane. Resistance is then measured again with the membrane in place. Membrane resistance may then be estimated by subtracting the electrolyte resistance without the membrane from the test result with the membrane in place.

The resistance may also be measured by determining a voltage vs. current curve in a cell having two well stirred chambers separated by the membrane. A calomel electrode may be used to measure the potential drop across the membrane. The slope of the potential drop vs. current curves may be obtained by varying voltage and measuring current.

Electrochemical impedance may also be used for the calculation. In this method, alternating current may be applied across the membrane. Measurement at a single frequency gives data relating to electrochemical properties of the membrane. By using frequency and amplitude variations, detailed structural information may be obtained.

The membranes described herein may have high permselectivity. Permselectivity may generally refer to the relative transport of counterions to co-ions during electrodialysis. For a theoretically ideal cation exchange membrane only positively charged ions would pass the membrane, giving a permselectivity of 1.0. Permselectivity may be found by measuring the potential across the membrane while it separates monovalent salt solutions of different concentrations.

The ion exchange membranes disclosed herein may have reduced water permeation. Permeation of the dilute flow through membrane defects under the driving force of the osmotic pressure difference between the dilute and concentrated streams may reduce efficiency. Water permeation may reduce current efficiency and purified water productivity by removing pure water. Water loss may be particularly severe in seawater electrodialysis with thin membranes because the high concentration difference between the concentrate (brine) side of the membranes and the pure water side of the membrane typically increases the osmotic driving force. Membrane defects may be particularly detrimental to operation as the high osmotic pressure will tend to force pure water through such defects and increase water loss, increasing power consumption.

The membranes disclosed herein may generally have a structure that allows high permeability of cations and low osmotic flow. Apparent permselectivity as used herein is the ratio of transport rate of counter-ions (cations) to co-ions (anions). Conventional measurement parameters do not indicate the rate of counter-ion removal. In certain embodiments, the membranes disclosed herein may be engineered to control cation permeability.

Cation permeability may be controlled by the structure of the ion (molecular size and total charge) and by the effect of membrane microstructure. The membrane microstructure can retard counter-ion permeability if the membrane is designed to have pores that are comparatively small. The relative term can be taken to mean that the counter-ions encounter high resistance from interactions with the membrane material in traversing the membrane, as if they were traversing a tunnel slightly larger than their apparent diameter. The membrane may have a relatively low water content, tending to reduce the pathways for counter-ion permeability. By balancing the content of hydrophilic monomer to increase counter-ion permeability with the amount and nature of cross-linking monomer, the water content and effective pore size of the membrane can be engineered. The cross-linking monomer may be selected to be a hydrophobic or hydrophilic monomer.

The membranes disclosed herein may generally comprise an ion exchange membrane support. The ion exchange membrane support may comprise a polymeric microporous substrate and a cross-linked ion-transferring polymeric layer on a surface of the substrate. The membrane support may be produced by a process comprising selecting a suitable porous substrate and incorporating a cross-linked ion-transferring polymeric layer on a surface of the substrate.

The microporous membrane substrate may be manufactured from polyolefins, polyvinylidene fluoride, or other polymers. One exemplary class of substrates comprises thin polyolefin membranes. Another exemplary class of substrates are manufactured from ultrahigh molecular weight polyethylene (UHMWPE). The microporous substrate may comprise microporous membranes of polypropylene, high molecular weight polyethylene, ultrahigh molecular weight polyethylene or polyvinylidene fluoride. The substrate may generally have a thickness of less than about 155 µm, for example, less than about 55 µm or less than about 25 µm.

Embodiments of the substrate membrane may have a porosity greater than about 45%, for example, greater than about 60%. In certain embodiments, the substrate membrane may have a porosity greater than about 70%. The substrate membrane may have a rated pore size of from about approximately 0.05 µm to about approximately 10 µm, for example, from about approximately 0.1 µm to about approximately 1.0 µm, or from about approximately 0.1 µm to about approximately 0.2 µm.

The membrane support may be produced by saturating the charged monomer in the pores of the substrate. The functional monomers, cross-linking agent, and a polymerization initiator may be polymerized in the pores of the substrate to form the cross-linked charged polymer. In certain embodiments, the functional monomers may include an ionogenic monomer, for example, a monofunctional ionogenic monomer. The cross-linking agent may include a multifunctional monomer. As used herein, the term ionogenic monomer may generally refer to a monomer species having at least one charged group covalently attached. The charged group may be positively charged or negatively charged, as described in more detail below. Monofunctional monomers may generally refer to monomers which have a single site for carrying forward the polymerization reaction. Multifunctional monomers may generally refer to monomers that have more than one polymerization reaction site and so can form networked or crosslinked polymers.

The process of polymerizing the cross-linked ion-transferring polymeric layer in the pores of the substrate may include saturating the substrate with a solution comprising the monofunctional ionogenic monomer, the multifunctional monomer, and the polymerization initiator. The process may include removing excess solution from the surfaces of the substrate while leaving the porous volume saturated with solution and initiating polymerization. Polymerization may be initiated by the application of heat, ultraviolet (UV) light, or ionizing radiation, optionally in the absence of substantially all oxygen. The process may be performed to incorporate the cross-linked ion-transferring polymeric layer substantially completely filling the pores of the substrate.

Thus, in certain embodiments, the membrane support may be produced by the polymerization of one or more ionogenic monomers, a neutral monomer, and a suitable crosslinker monomer. Exemplary neutral monomers are hydroxyethyl acrylate and hydroxymethylmetacrylate. Other neutral monomers are within the scope of the disclosure. The ionogenic monomer may be selected to produce a cation exchange membrane or an anion exchange membrane.

The monomer mixture may be selected to engineer a cross-linked copolymer to produce a membrane having a desired balance of properties. For example, combining a water soluble and/or swellable ionogenic monomer with a non-water swelling comonomer may produce a copolymer with a high degree of ionic groups and reduced swelling in water. Such an ion exchange membrane may be used for desalination. In particular, the exemplary copolymers may have better physical strength in water and suffer less dimensional change in use due to changes in water ionic content or temperature changes. Thus, the exemplary ion exchange membranes may exhibit a suitable mechanical strength, low electrical resistance, and high permselectivity, for example, for seawater electrodialysis.

Monomers containing negatively charged groups include as representative examples, without being limited by such examples, sulfonated acrylic monomers suitable to provide cation exchange capacity, for example, 2-sulfoethylmethacrylate (2-SEM), 2-Propylacrylic acid, 2-acrylamide-2-methyl propane sulfonic acid (AMPS), sulfonated glycidylmethacrylate, 3-sulfopropyl methacrylate, sodium 1-allyloxy-2 hydroxypropyl sulfonate and the like. Other exemplary monomers are acrylic and methacrylic acid or their salts, sodium styrene sulfonate, styrene sulfonic acid, sulfonated vinylbenzyl chloride sodium 1-allyloxy-2 hydroxypropyl sulfonate, 4-Vinylbenzoic acid, Trichloroacrylic acid, vinyl phosphoric acid and vinyl sulfonic acid. Preferred monomers are 2-sulfoethylmethacrylate (2-SEM), styrene sulfonic acid and its salts, and 2-acrylamide-2-methyl propane sulfonic acid (AMPS).

Cation exchange membrane embodiments described herein may have a resistivity of less than about approximately 1.0 $\Omega$-cm$^2$, for example, less than about approximately 0.5 $\Omega$-cm$^2$. Certain embodiments of the cation exchange membranes described herein may have a permselectivity of greater than about approximately 95%, for example, greater than about approximately 99%. In some embodiments, the ionogenic monomers for the production of cation exchange membranes may be or comprise 2-sulfoethylmethacrylate (2-SEM) or 2-acrylamide-2-methyl propane sulfonic acid (AMPS). One exemplary cross-linker is ethyleneglycoldimethacrylate. Other ionogenic monomers and crosslinkers are within the scope of the disclosure.

Monomers containing positively charged groups include as representative examples, without being limited by such examples, Methacrylamidopropyltrimethyl ammonium chloride, trimethylammoniumethylmethacrylate, quaternary salts of polyamines and vinylaromatic halides, for example, 1,4-diazabicyclo[2,2,2]octane di(vinylbenzyl chloride) (a quaternary salt of 1,4-diazabicyclo[2,2,2]octane (DABCO) and piperazine divinyl chloride), or quaternary salts formed by reacting cyclic ethers, polyamines and alkyl halides, for example, Iodoethyldimethylethylenediamino2-hydroxylpropyl methacrylate (a quaternary ammonium salt formed by reacting glycidylmethacrylate (GMA) with N,N-dimethylethylenediamine and ethyl iodide), and vinylbenyltrimethylammonium chloride. Other exemplary monomers for anion exchange membranes include Trimethylammoniumethylmethacrylic chloride, 3-(acrylamidopropyl)trimethylammonium chloride, N,N,N',N',N''-pentamethyldiethylenetriamine di(vinylbenzyl chloride (a quaternary salt of N,N,N',N',N''-pentamethyldiethylenetriamine and vinylbenzyl chloride), Glycidyl methacrylate/trimethylamine, or Glycidyl methacrylate/N,N-dimethylethylenediamine reaction product.

Anion exchange membrane embodiments described herein may have a resistivity of less than about approximately 1.0 $\Omega$-cm$^2$, for example, less than about approximately 0.5 $\Omega$-cm$^2$. In certain embodiments, the anion exchange membranes described herein may have a permselectivity of greater than about approximately 90%, for example, greater than about approximately 95%. In some embodiments, the ionogenic monomers for the production of anion exchange membranes may be or comprise Trimethylammoniumethylmethacrylic chloride crosslinked with ethyleneglycoldimethacrylate, or glycidyl methacrylate/N,N-dimethylethylenediamine reaction product crosslinked with ethyleneglycoldimethacrylate, and the crosslinked ion transferring polymer formed by polymerization of N,N,N',N',N''-pentamethyldiethylenetriamine di(vinylbenzyl chloride (a quaternary salt of N,N,N',N',N''-pentamethyldiethylenetriamine and vinylbenzyl chloride) or 1,4-diazabicyclo[2,2,2]octane di(vinylbenzyl chloride) (a quaternary salt of 1,4-diazabicyclo[2,2,2]octane (DABCO) and vinylbenzyl chloride).

The charged monomer solution may include the functional monomer at a concentration of at least about 50 wt %. For example, the charged monomer solution may include the functional monomer at a concentration of between about 50 wt % and 75 wt %. The charged monomer solution may include the functional monomer at a concentration of about 50 wt %, about 55 wt %, about 60 wt %, about 65 wt %, about 70 wt %, or about 75 wt %.

The cross-linking agent may comprise at least one of divinyl benzene (DVB) and ethylene glycol dimethacrylate (EGDM). Multifunctional monomers containing one or more ionic groups may be used. Without being limited by the example, monomers such as 1,4-divinylbenzene-3 sulfonic acid or its salts may be used. The degree of crosslinking may range from 2% to 60%. Multifunctional monomers suitable to provide crosslinking with monomers containing negatively or positively charged groups include as representative examples, without being limited by such examples ethylene glycol dimethacrylate, 1,3-butanediol dimethacrylate, 1,3-butanediol diacrylate, 1,4-butanediol dimethacrylate, 1,4-butanediol diacrylate, 1,6-hexanediol diacrylate, pentaerythritol triacrylate, tetraethylene glycol dimethacrylate, divinyl benzene, trimethylolpropane triacrylate, isophorone diisocyanate, glycidylmethacrylate, trimethylolpropane trimethacrylate, ethoxylated (n)bisphenol A di(meth)acrylate (n=1.5, 2, 4, 6, 10, 30), ethoxylated (n)trimethylolpropanetri(meth)Acrylate (n=3,6,9,10,15,20), propoxylated(n)trimethylolpropane triacrylate (n=3,6), vinylbenzyl chloride, glycidyl methacrylate, and the like.

An organic solvent may be used as a reactant carrier. One useful class of solvents is dipolar aprotic solvents. Some examples of suitable solvents include dimethyl acetamide, dimethyl formamide, dimethyl sulfoxide, hexamethylphosphoramide or -triamide, acetone acetonitrile, and acetone. The organic solvent may be employed for solvating ionic group containing monomers and monomers that are not water soluble. One exemplary solvent is N-methyl pyrrolidone. Other solvents which may be employed are N-propanol and dipropylene glycol. Similar hydroxy containing solvents, such as alcohols, for example isopropanol, butanol, diols such as various glycols, or polyols, such as glycerine, may be used in certain embodiments. Other solvents are within the scope of the disclosure. The solvents discussed may be used alone or in combination. In some the solvents may be used with water to increase solubility of ionic containing organics.

The substrate pore filling or saturation process may be done at a slightly elevated temperature (for example, greater than 40° C.) to reduce air solubility. In other embodiments, the substrate pore or saturation process may be done after a mild vacuum treatment of the substrate sample submerged in the formulation solution. Substrate samples may be pre-soaked and then placed on a polyester or similar sheet and covered with a covering sheet. The soaked and covered substrate may be smoothed out to remove air bubbles.

The method of producing the membrane may comprise saturating a polymeric microporous substrate with a charged monomer solution comprising at least one functional monomer and an effective amount of at least one polymerization initiator. A polymerization step may be initiated to polymerize the functional monomers.

Conventionally, the polymerization step is a thermal polymerization. The solution may comprise a thermal initiator. Table 1 shows a charged monomer solution formulation that includes 2,2'-azobisisobutyronitrile (AIBN), an exemplary thermal initiator. FIG. 1 is a representation of the thermal decomposition of AIBN.

TABLE 1

Charged Monomer Solution Formulation with Thermal Initiator

| Material | Percent (% g) | Weight (g) |
|---|---|---|
| NMP | 12.63 | 31.57 |
| 1-BuOH | 8.84 | 22.11 |
| DPG | 0.63 | 1.58 |
| EGDM | 15.41 | 38.51 |
| DVB | 3.79 | 9.47 |
| AA | 1.26 | 3.15 |
| 2-SEM | 56.81 | 142.01 |
| AIBN | 0.64 | 1.60 |

For thermal polymerization, the soaked substrate may be heated in an oven at a temperature sufficient and for a time necessary to initiate complete polymerization. The soaked substrate may be placed on a heated surface at a temperature sufficient and for a time necessary to initiate and complete polymerization. However, the temperature sufficient to initiate and complete polymerization is often between 90° C. and 110° C., and sometimes up to 120° C. The time necessary to initiate and complete polymerization at this temperature may be up to or longer than about 6 minutes. Thus, the energy requirement for thermal initiation is high. Exposure to high temperature for such a long period of time may cause thermal damage to functional groups. Additionally, the polymerization cannot be halted quickly. The polymerization will generally continue until the substrate cools to a temperature that halts polymerization.

Polymerization by exposure to UV light may be performed at room temperature, in a shorter amount of time, and may be initiated and halted instantaneously. UV light initiation with suitable polymerization initiators may be used. The method may include irradiating the assembly with UV light at an intensity sufficient and for a time necessary to initiate and complete polymerization.

Figure 2:
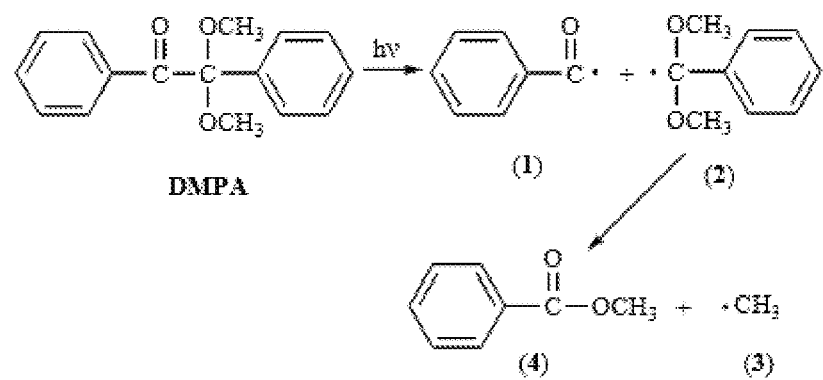
FIG. 2 is a representation of the photo decomposition (ultraviolet light) of 2,2-dimethoxy-2-phenyl-actetophenone (DMPA)

The method may include saturating the membrane with a solution comprising a photo-initiator used instead of a thermal initiator. A photo-initiator is a molecule that absorbs light at a certain wavelength and decomposes into radicals that initiate polymerization. Typically, UV initiators adsorb UV light which results in decomposition into radicals that can attack the ion exchange monomers and induce polymerization. One exemplary photo-initiator is 2,2-dimethoxy-2-phenyl-actetophenone (DMPA). FIG. 2 is a representation of the UV decomposition of DMPA. The resulting radicals from UV decomposition may be used for polymerization of the ion exchange membrane substrate. Table 2 is a charged monomer solution formulation, including the photo-initiator DMPA.

TABLE 2

Charged Monomer Solution Formulation with Photo Initiator

| Material | Percent (% g) | Weight (g) |
|---|---|---|
| NMP | 12.63 | 31.57 |
| 1-BuOH | 8.84 | 22.11 |
| DPG | 0.63 | 1.58 |
| EGDM | 15.41 | 38.51 |
| DVB | 3.79 | 9.47 |
| AA | 1.26 | 3.15 |
| 2-SEM | 56.81 | 142.01 |
| DMPA | 0.64 | 1.60 |

The charged monomer solution formulation may be prepared by combining all components (for example, functional monomers and photo-initiator) and stirring for a time sufficient to achieve substantially complete dissolution. The charged monomer solution may be formulated to increase transparency of the saturated substrate upon exposure to UV light. Thus, in some embodiments, the saturated substrate may change color from translucent white to transparent. The increase of transparency may allow the UV light to penetrate the substrate, enabling a complete and even polymerization of the membrane support.

The charged monomer solution may be substantially free of any inhibitor. Inhibitors are conventionally added to monomer solutions including a thermal initiator to improve stability during coating. The monomer solutions including photo-initiators disclosed herein may be substantially free of any inhibitor. One exemplary inhibitor is 4-methoxyphenol (MEHQ). However, the charged monomer solution may be substantially free of any inhibitor.

The charged monomer solution may comprise at least one chain transfer agent to enable chain transfer polymerization. Chain transfer polymerization generally involves transferring the polymerization activity of a growing polymer chain to the chain transfer agent, a monomer, a polymer, or a solution molecule. Chain transfer agents typically have at least one weak chemical bond, which facilitates the chain transfer reaction. Common chain transfer agents include thiols, for example, dodecyl mercaptan (DDM), and halocarbons such as carbon tetrachloride. One exemplary chain transfer agent is pentaerythritol tetra(mercaptopropionate) (PETMP). Other chain transfer agents may be included.

The microporous polymeric substrate may be saturated with the stirred solution and exposed to UV light until complete polymerization occurs. In particular, the methods may include irradiating the assembly with UV light at an intensity sufficient to initiate and complete polymerization. Thus, the methods may include exposing the soaked substrate to UV light at an intensity effective to penetrate the substance and effective to cross-link the at least one functional monomer and produce the ion exchange membrane. The intensity may be between about 200 and 2200 mW/cm$^2$. The intensity may be selected based on process conditions such as, for example, amount of time to complete polymerization. The intensity may be selected based on substrate parameters such as, for example, thickness and/or transparency of the substrate. Thus, the intensity may be between about 200 and 500 mW/cm$^2$, between about 500 and 2000 mW/cm$^2$, or between about 2000 and about 2200 mW/cm$^2$, based on an amount of time of exposure.

In particular, the irradiation may be selected to be a value sufficient to penetrate the substance. Attenuation of the UV light may be considered, and the methods may be employed to reduce attenuation through the bulk of the substrate. Conventionally, UV cured membranes suffer from uneven curing due to ineffective irradiation through the bulk of the membrane. For instance, membranes having a thickness of from 100 μm to 500 μm or not being sufficiently translucent to the UV light may not be irradiated with UV light having a sufficient intensity to penetrate the substrate. The UV light may be attenuated and the effect is lost, resulting in uneven curing and polymerizing of the substrate. The methods disclosed herein may comprise exposing the soaked substrate to UV light at an intensity effective to penetrate the substance and effective to cross-link the at least one functional monomer and produce the ion exchange membrane. In exemplary embodiments, the selected UV light intensity may be combined with a soaked substrate having a thickness of between 25 μm and 55 μm and being transparent to produce a superior ion exchange membrane.

The methods may comprise exposing the soaked substrate to UV light for an amount of time effective to cross-link the at least one functional monomer and produce the ion exchange membrane support. As previously described, UV initiation may occur at a faster rate as compared to thermal initiation. The increased rate of polymerization may increase the overall rate of manufacture of the ion exchange membrane and reduce production costs.

The soaked substrate may be exposed to the UV light for a time necessary to initiate and complete polymerization. Thus, the methods may include irradiating the substrate for an amount of time effective to cross-link the at least one functional monomer and produce the ion exchange membrane. The amount of time necessary to initiate and complete polymerization may be selected based on process conditions such as, for example, intensity of the UV light. The amount of time may generally be less than 1 minute. For instance, the amount of time may be less than 30 seconds, less than 20 seconds, or less than 10 seconds. The amount of time may be, for example, between about 30 seconds and about 1 minute, between about 20 seconds and about 30 seconds, between about 5 seconds and between about 20 seconds, between about 5 seconds and about 10 seconds, between about 3 seconds and about 5 seconds, or between about 1 second and about 5 seconds. In general, the greater intensity may be correlated with a lower amount of time necessary to initiate and complete polymerization.

The conversion or rate of polymerization may be increased by photo-polymerizing the soaked substrate in an environment which is substantially free of oxygen or air. Oxygen may act as a polymerization inhibitor. In some embodiments, the exposure to UV light may be performed in an environment saturated by an inert gas, for example, nitrogen. The exposure to UV light may be performed in a chamber filled with nitrogen or another inert gas, and substantially free of oxygen. In other embodiments, the soaked substrate may be placed between two films. Any air bubbles may be removed from the soaked substrate. The films may be of any inert material. The upper film may be any inert material as long as it is substantially transparent to UV light. The lower film may be any inert material. In embodiments in which the soaked substrate is exposed to UV light on the top and bottom surface, both the upper and the lower film may be substantially transparent to UV light. The upper film may be, for example, polypropylene or polyethylene. The lower film may be, for example, polyester or polyethylene.

In some embodiments, the method may comprise exposing the saturated polymeric microporous substrate to UV light on a top and bottom surface of the sheet. The irradiation from each UV light may be adjusted to provide an appropriate intensity, for example, an intensity sufficient to penetrate the saturated or soaked substrate. Thus, the method may comprise exposing the soaked substrate to UV light having an intensity between 200 mW/cm$^2$ and 500 mW/cm$^2$ on each of the top and bottom surface.

The method may comprise pulsating the UV light. The UV light may be pulsated so as to control the temperature of the substrate. It is recognized that exposure to UV light may increase the temperature of the substrate. As previously mentioned, high temperature may contribute to damage to the functional groups. Thus, by pulsating the UV light, the temperature may be controlled, protecting the functional groups. The amount of time sufficient to initiate and complete polymerization may be regarded as the total amount of time of exposure to the UV light. The pulse may comprise, for example, 1-10 second pulses. Each pulse may independently be, for example, 1 second, 2 seconds, 3 seconds, 4 seconds, 5 seconds, 6 seconds, 7 seconds, 8 seconds, 9 seconds, or 10 seconds. The pauses may comprise, for example, 1-10 second pauses. The pulse and pause of UV light may be the same or different. Each pause may independently be, for example, 1 second, 2 seconds, 3 seconds, 4 seconds, 5 seconds, 6 seconds, 7 seconds, 8 seconds, 9 seconds, or 10 seconds. In some embodiments, the method may comprise monitoring temperature of the soaked substrate or area surrounding the soaked substrate. UV light may be pulsed upon detection of a threshold temperature, for example, a temperature greater than 25° C. or greater than 30° C. UV light may be applied continuously upon detection of a threshold temperature, for example, a temperature less than 30° C. or less than 25° C. Additionally, the length and amount of UV pulses and/or pauses may be selected upon detection of a threshold temperature.

Figure 3:
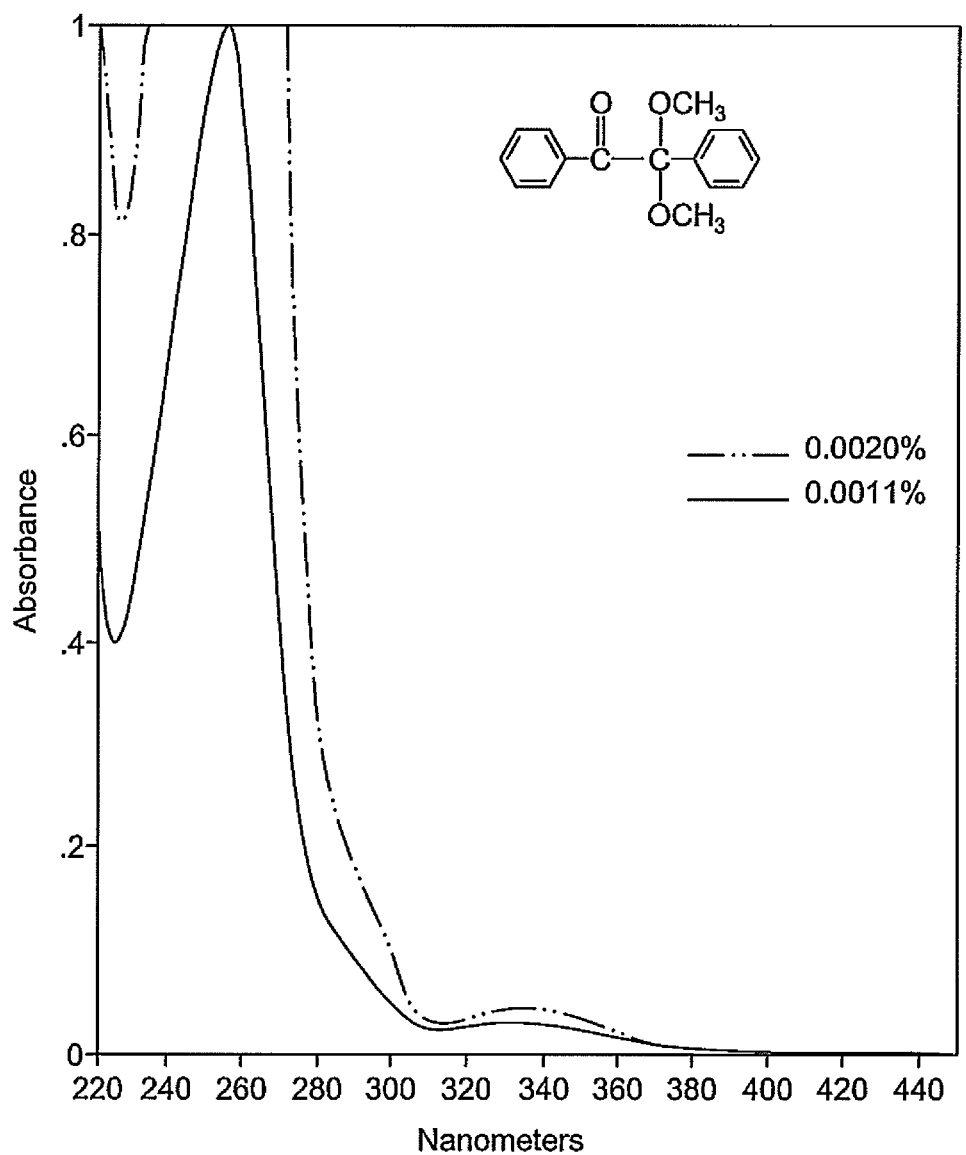
FIG. 3 is a graph of the ultraviolet light absorption wavelength of DMPA.
Figure 4:
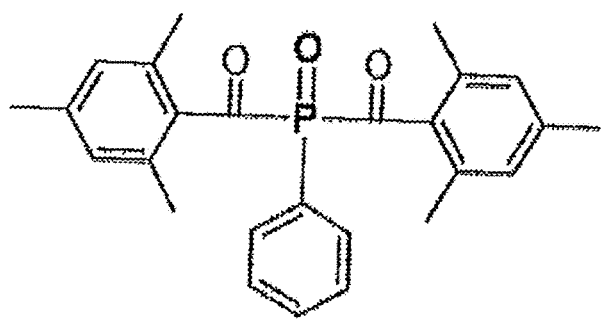
FIG. 4 is a representation of the chemical structure of bis-acylphosphinoxide (BAPO)

The photopolymerization can be performed in the presence of one or more photo-initiators, for example, two or more photopolymerization initiators. Exemplary photo-initiators, such as DMPA, absorb UV light in a wavelength range of about 250 nm, as shown in FIG. 3. At short wavelengths, a better surface cure can be achieved when used at moderately high concentrations in the formulation. Another exemplary photo-initiator, bis-acylphosphinoxide (BAPO), which absorbs UV light in the wavelength range of between about 350-420 nm may also be used. In particular, BAPO may provide better substrate penetration and better depth curing. FIG. 4 is a representation of the chemical structure of BAPO. The photopolymerization initiator may comprise at least one of 1-hydroxy-cyclohexyl phenyl ketone, phenyl bis(2,4,6-trimethylbenzoyl) phosphine oxide, bis-acylphosphinoxide, 2-hydroxy-2-methylpropiophenone, 2,2'-azobisisobutyronitrile, and 2,2-dimethoxy-2-phenyl-acetophene.

In general, the UV light wavelength may be selected to correspond with a wavelength range which activates the photopolymerization initiator. The photopolymerization initiator may have a maxima of absorption within the applied wavelength. The saturated polymeric substrate may be exposed to UV light having a wavelength effective to photoiniate the at least one polymerization initiator. The wavelength range may be between 245 nm and 420 nm. The wavelength range may be, for example, between 245 nm and 300 nm, between 300 nm and 350 nm, or between 350 nm and 420 nm.

Figure 5:
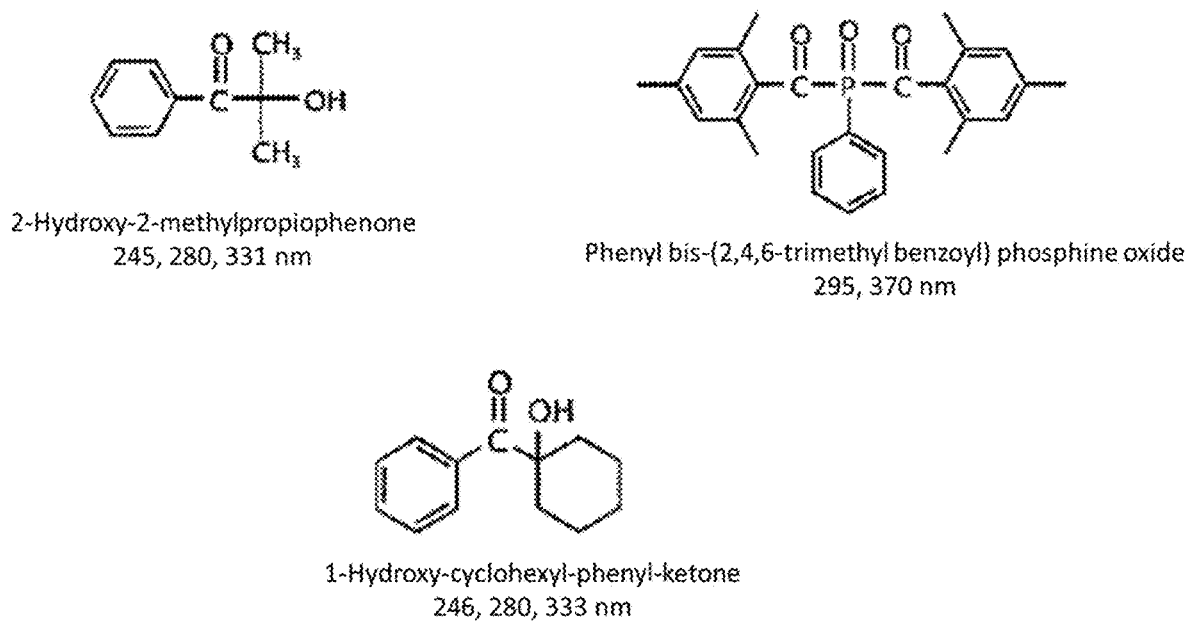
FIG. 5 includes representations of exemplary photopolymerization initiators and their effective initiation wavelengths.

Exemplary photopolymerization initiators and their effective wavelengths are shown in FIG. 5. Briefly, photo-initiators such as 2-hydroxy-2-methylpropiophenone absorb light having a wavelength between 245 nm-331 nm (namely at 245 nm, 280 nm, and 331 nm); photo-initiators such as BAPO absorb light having a wavelength between 295 nm-370 nm (namely at 295 nm and 370 nm); and photo-initiators such as 1-hydroxyl-cyclohexyl-phenylketone absorb light having a wavelength between 246 nm-333 nm (namely at 246 nm, 280 nm, and 333 nm).

The charged monomer solution may be formulated to comprise two or more photopolymerization initiators configured to photoinitiate at different wavelength ranges. At shorter wavelengths (for example, between 245 nm and 300 nm) better surface cure can be achieved and the photo-initiators can be used at moderately high concentrations. At longer wavelengths (for example, between 300 nm and 420 nm) the UV light typically provides better body penetration and better depth cure achievement. The method may comprise exposing the soaked substrate to a UV light in a first wavelength range and UV light in a second wavelength range. The UV light may be pulsated in the first wavelength range for 1-10 seconds, as previously described. The UV light may be pulsated in the second wavelength range for 1-10 seconds, as previously described. In accordance with certain embodiments, the two or more photopolymerization initiators may have a synergistic effect in polymerizing the charged monomers.

In one exemplary embodiment, the method may comprise saturating the substrate with a solution comprising BAPO and 2-hydroxy-2-methylpropiophenone or 1-hydroxyl-cyclohexyl-phenylketone to take advantage in the variation of photo-initiating wavelengths.

The polymerization initiator may comprise a free radical polymerization initiator. Free radical polymerization initiators which may be employed include, for example, benzoyl peroxide (BPO), ammonium persulfate, 2,2'-azobisisobutyronitrile (AIBN), 2,2'-azobis(2-methylpropionamidine)dihydrochloride, 2,2'-Azobis[2-(2-imidazolin-2yl)propane]dihydrochloride, 2,2'-Azobis[2-(2-imidazolin-2-yl)propane], and dimethyl 2,2'-azobis(2-methylpropionate).

The charged monomer solution may comprise a cross-linking agent and an effective amount of the photopolymerization initiator to induce cross-linkage of the functional monomers. The effective amount may generally be dependent on process factors such as type and concentration of the functional monomers, type and concentration of the cross-linking agent, type of photopolymerization initiator, ultraviolet light intensity, time of exposure to ultraviolet light, and other factors which affect the intensity of UV irradiation, such as distance from the ultraviolet light source, obstruction of light from the ultraviolet light source (for example, by a filter), precipitated compounds in the charged monomer solution, and others. For instance, it has been discovered that certain photopolymerization initiators precipitate in the charged monomer solution over time. Thus, in accordance with certain embodiments, the charged monomer solution may be prepared the same day as use. The charged monomer solution may be prepared within 5 days from use, within 4 days from use, within 3 days from use, within 2 days from use, or within 1 day from use. The charged monomer solution may be prepared at the time of use.

The effective amount may generally be between about 2% w/w and about 5% w/w. The effective amount may be, for example, about 1% w/w, about 2% w/w, about 3% w/w, about 4% w/w, about 5% w/w, or about 6% w/w. The effective amount of the photopolymerization initiator may be about 2% w/w for an exposure time of about 20 to 30 seconds. The effective amount of the photopolymerization initiator may be about 5% w/w for an exposure time of about 1 to 3 seconds. The effective amount of the photopolymerization initiator may include the one or more photopolymerization initiators, for example, the two or more photopolymerization initiators. Any two photopolymerization initiators may be included in the charged monomer solution at a ratio of between 2:1 to 1:2 of the first photopolymerization initiator relative to the second.

A continuous pilot or manufacturing method may comprise saturating the porous substrate, initiating and completing the polymerization, and washing or leaching out non-polymerized species from the now-formed membrane support. The membrane may be optionally dried. Conditioning with a salt solution may be performed in a continuous immersion process, such as through a tank of a salt solution, or by soaking a wound-up roll of membrane, or after fabrication into a module.

If the monomer solution is formulated with a solvent which wets out the substrate, the process may start by feeding substrate from a roll into and through a tank of the monomer formulation and wiping off excess solution. The soaked substrate may be assembled between two layers of plastic sheeting fed from rolls and nipped between two rolls to remove air and produce a smooth multilayered assembly. The removal of air bubbles may create an oxygen free environment. One exemplary sheeting material is polyethylene terepthalate film. Other sheeting materials may be employed. An alternative method to the sheeting material assembly may include running the saturated sheet through the UV source blanketed with inert gas to create the substantially oxygen free environment.

The assembly may be processed through an ultraviolet lamp, to initiate and complete polymerization. For example, the three-layer assembly described may be run on a conveyor belt and/or through a tunnel or other process equipment having an inlet and outlet for the soaked substrate assembly with UV light sources on one or both sides of the assembly. In some embodiments, the method may comprise adjusting speed of the substrate through the UV light source to control the amount of time of exposure to the UV light. The covering sheets may be removed after polymerization. The now-formed membrane support may be washed and optionally dried.

The membrane support may be treated with a solution comprising an acid or a base to form the ion exchange membrane. For instance, the membrane support may be soaked in a solution comprising NaOH or another suitable base for an amount of time effective to functionalize the ion exchange membrane support and produce the ion exchange membrane. The amount of time may be, for example, between 10-20 minutes, for example, about 15 minutes. The solution may comprise, for example, about 1.5N NaOH. The ion exchange membrane may be conditioned with a salt solution. The salt solution may comprise, for example, NaCl or another suitable salt. The salt solution may comprise, for example, about 0.5M NaCl. Between, before, and/or after the soak and conditioning treatments, the ion exchange membrane or membrane support may be rinsed with water and dried.

The methods may further comprise functionalizing an exterior surface of the ion exchange membrane to produce a monovalent selective ion exchange membrane. Briefly, the ion exchange membrane may be functionalized with a charged compound layer. In accordance with certain embodiments, the charged compound layer may be chemisorbed to the ion exchange membrane, such that the charged compound is bound to the membrane support by a covalent bond. The charged compound layer may be chemisorbed through one or more intermediate layers, for example, a styrene or acrylic based intermediate layer having a sulfonic group bound to a polymerized intermediate layer having an amine group, for example PEI or branched PEI. The styrene or acrylic based intermediate layer may provide stability to the covalent bond and increase membrane lifespan. The PEI or branched PEI may be selected to have a size sufficient to bind an exterior surface of the membrane without substantially penetrating pores of the membrane substrate. In some embodiments, the branched PEI may have a molecular weight of at least 60,000 g/mol. Any of the intermediate layers may be polymerized by UV light with a suitable photopolymerization initiator, as described herein. The charged functional layer may then be bound to the intermediate layer.

The ion exchange membranes disclosed herein have reduced water permeation. Polymers often expand in water due to charge repulsion from the similar charges on the monomer units. The expansion may hinder diffusion into the pores of the substrate and reduce the amount of charge that can be permanently placed into the substrate. The manufacturing methods for the membranes typically include long and repetitive drying and soaking periods, which tend to increase manufacturing costs.

Efficiency is typically reduced by permeation of the dilute flow through membrane defects under the driving force of osmotic pressure difference. Water permeation tends to reduce current efficiency and purified water productivity by removing pure water. Water loss is particularly seen in seawater electrodialysis applications with thin membranes because the high concentration difference between the concentrate (brine) side and the pure water side of the membrane increases the osmotic driving force. Thus, membrane defects may be particularly detrimental to operation in seawater desalination, as the high osmotic pressure tends to force pure water through such defects and increase water loss and increase power consumption.

Anion exchange membranes produced by the UV initiation methods disclosed herein may have a permselectivity of at least 90%, for example, between 90%-92%, at least 92%, between 92%-94%, or at least 94%. The anion exchange membranes may have a resistance of less than 1 $\Omega\text{-cm}^2$, for example, less than 0.7 $\Omega\text{-cm}^2$ or less than 0.5 $\Omega\text{-cm}^2$.

Cation exchange membranes produced by the UV initiation methods disclosed herein may have a permselectivity of at least 100%, for example, between 100%-102%, at least 102%, between 102%-104%, or at least 104%. The anion exchange membranes may have a resistance of less than 3 $\Omega\text{-cm}^2$, for example, less than 2 $\Omega\text{-cm}^2$, or 1.5 $\Omega\text{-cm}^2$ or less.

Ion exchange membranes may be used for desalination of water by electrodialysis (ED), as a power generating source in reverse electrodialysis, or as separators in fuels cells. Thus, water treatment systems disclosed herein may be or comprise desalination systems, power generating systems, or reverse electrodialysis systems. Other applications include recovery of metal ions in the electroplating and metal finishing industries and applications in the food and beverage industry. In other embodiments, water treatment systems disclosed herein may be or comprise metal ion recovery systems or food and beverage processing systems.

In a particular exemplary embodiment, the ion exchange membranes disclosed herein may be used for ground water treatment and/or in agricultural settings. The water treatment systems disclosed herein may be or comprise ground water treatment systems. The water treatment systems disclosed herein may be or comprise agricultural irrigation runoff treatment systems. The methods may comprise treating ground water. The methods may comprise treating agricultural water runoff.

In particular, the ion exchange membranes described herein may be sufficiently stable to withstand organic contaminants such as benzyne, toluene, ethylbenzene, and xylene for extended periods of time while in use. Thus, the ion exchange membranes disclosed herein may be used to treat wastewater comprising organic contaminants, such as, produced water, ground water, brackish water, brine, and seawater. The wastewater may comprise, for example, between about 100-1000 ppm of TDS. In certain embodiments, the wastewater may comprise, for example, between about 100-400 ppm TDS, between about 400-600 ppm TDS, or between about 600-1000 ppm TDS. Additionally, the cation exchange membranes disclosed herein may be used for agricultural water treatment, where use of water with a high sodium content can damage soil, but magnesium and calcium are beneficial.

The methods disclosed herein may be used for preparation of both anion exchange membranes and cation exchange membranes. Certain functional monomers and cross-linking agents were disclosed. However, this disclosure is not limited to the specific chemistries shown. For example, other functional monomers may be used. In addition, different cross-linking agents may be used along with mixtures of cross-linking agents. Also, many different photo-initiators can be used.

EXAMPLES

The function and advantages of these and other embodiments can be better understood from the following examples. These examples are intended to be illustrative in nature and are not considered to be limiting the scope of the invention.

Example 1: Production of Cation Exchange Membrane Test Coupons

The following laboratory method was used to investigate formulation and process effects by producing small coupons for resistivity and permselectivity testing. Porous membrane substrate 43 mm diameter coupons were die cut. Somewhat larger discs (50 mm or 100 mm diameter) of transparent polyester sheets were also die cut. A 105 mm aluminum weighing boat was used to hold a set of coupons. The coupons were sandwiched between two polyester film discs.

First, substrate coupons were thoroughly wetted with a monomer solution to make up a test sample. This was done by adding the formulated solution to the aluminum boat, and immersing a polyester film disc with a substrate coupon layered on it into the solution so that the porous support is saturated. The saturated support was then removed from the monomer solution and placed on a piece of polyester film. Air bubbles were removed from the coupon by, for example, smoothing or squeezing the coupon with a convenient tool, such as a small glass rod, or by hand. A second polyester disc was then layered on top of the first coupon and smoothed to have complete surface contact between the coupon and the lower and upper polyester film layers. A second porous substrate was then layered on the upper polyester film and the saturation, smoothing and addition of a over layer of polyester film repeated to give a multilayer sandwich of two coupons and three protective polyester film layers. A typical experimental run would have a multilayered sandwich of 10 or more saturated substrate coupon layers. The rim of the aluminum boat was crimped down to hold the disc/coupon assembly, if required.

The boat and assembly were then placed in a sealable bag, typically a zip-lock polyethylene bag and a low positive pressure of inert gas, usually nitrogen, added before sealing the bag. The bag containing the boat and coupon assembly was placed into an oven at 80° C. for up to 30 minutes. The bag was then removed and cooled, and the now reacted cation exchange membrane coupons were placed in 0.5N NaCl solution at 40° C.-50° C. for at least 30 minutes, with NaCl soak of up to 18 hours being found satisfactory.

Figure 6:
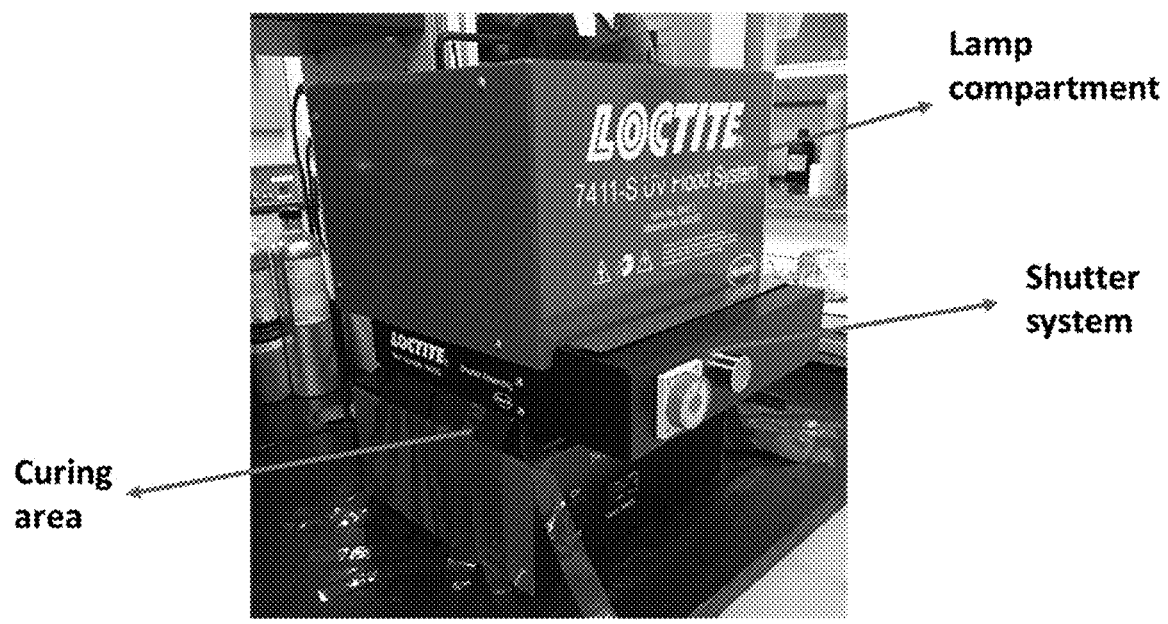
FIG. 6 is a photograph of an ultraviolet light curing device.
Figure 7:
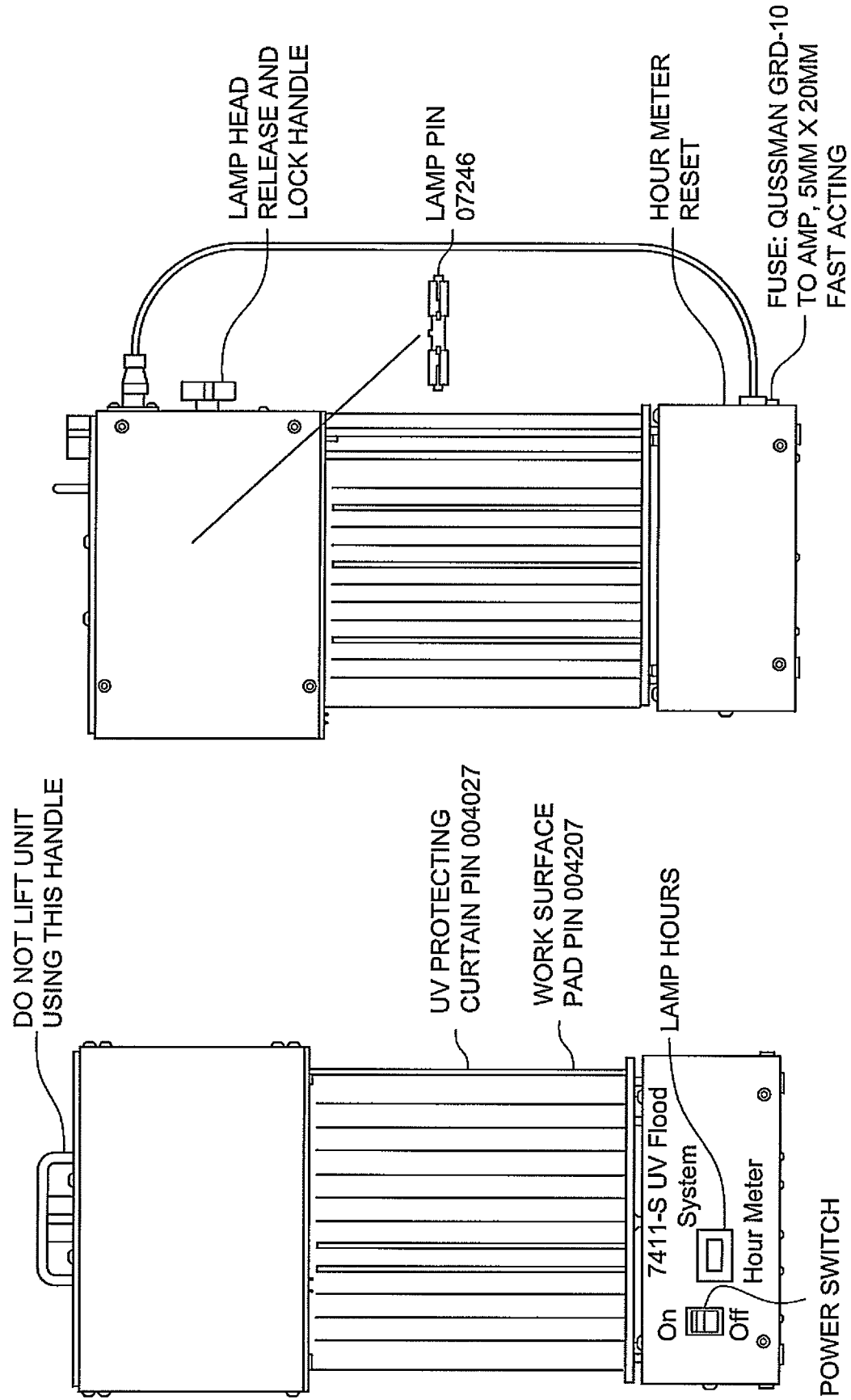
FIG. 7 is a schematic diagram of an ultraviolet light curing device.
Figure 8:
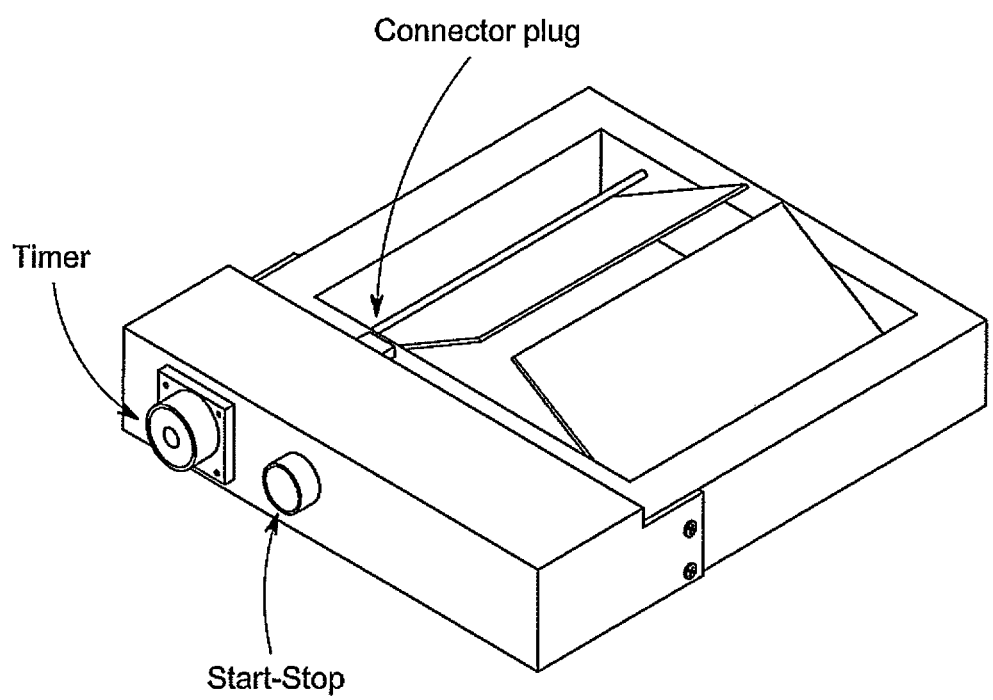
FIG. 8 is a schematic diagram of a timer for use with the ultraviolet light curing device of FIGS. 6 and 7.

Example 2: Preparation of an Ion Exchange Membrane with a Photopolymerization Initiator An ultraviolet curing device as shown in the photograph of FIG. 6 and diagram of FIG. 7 was used to polymerize a charged monomer layer of an ion exchange membrane support. The curing device included a shutter system as shown in FIG. 8. The shutter was equipped with a timer that controls the amount of time of exposure to the UV-light. The system also included an on/off button used to control the start of exposure to the UV-light for the preset amount of time. The usable wavelength of the map was between 250 nm and 600 nm.

Conventional Ion Exchange Membranes

Conventional ion exchange membranes were prepared with methods similar to the method described in example 1. In particular, the functional monomers were polymerized by thermal polymerization. The charged monomer formulations were prepared as described in Tables 3-4. Anion exchange membranes and cation exchange membranes were prepared by selecting the appropriate functional monomers.

TABLE 3

Conventional Anion Exchange Charged Monomer Solution Formulation

| # | Chemical | Abbreviation | CAS # | % weight |
|---|---|---|---|---|
| | PART A | | | |
| 1 | Dipropylene glycol | DPG | 25265-71-8 | 8.54 |
| 2 | 1-Propanol | PA | 71-23-8 | 5.74 |
| 3 | De-ionized Water | H2O | 7732-18-5 | 0.41 |
| 4 | (2-(Methacryloyloxy) Ethyl)trimethyl-ammonium chloride | TMAEMC, | 5039-78-1 | 35.85 |
| 5 | (Vinylbenzyl)-trimethylammonium chloride | QBM (VBTMAC) | 26616-35-3 | 26.74 |
| 6 | 2-Hydroxyethyl methacrylate | HOEMA | 868-77-9 | 11.50 |
| 7 | Divinylbenzene | DVB | 1321-74-0 | 9.96 |
| 8 | 4-Methoxyphenol | MEHQ | 150-76-5 | 0.10 |
| | PART B | | | |
| 9 | Dipropylene glycol | DPG | 25265-71-8 | 1.00 |
| 10 | 2,2'-Azobis(2-methyl propionitrile) | AIBN | 78-67-1 | 0.16 |

TABLE 4

Conventional Cation Exchange Charged Monomer Solution Formulation

| # | Chemical | Abbreviation | CAS # | % weight |
|---|---|---|---|---|
| 1 | 1-Methyl-2-pyrrolidinone | NMP | 872-50-4 | 12.703 |
| 2 | 1-Butanol | BA | 71-36-3 | 8.898 |
| 3 | Dipropylene glycol | DPG | 25265-71-8 | 0.634 |
| 4 | Ethylene glycol dimethacrylate | EGDM | 97-90-5 | 15.501 |
| 5 | Divinylbenzene | DVB | 1321-74-0 | 3.815 |
| 6 | Acrylic Acid | AA | 79-10-7 | 1.268 |
| 7 | 2-Sulfoethyl methacrylate | 2-SEM | 10595-80-9 | 57.182 |
| | PART B | | | |
| 8 | 1-Methyl-2-pyrrolidinone | NMP | 872-50-4 | 2.00 |
| 9 | 2,2'-Azobis(2-methyl propionitrile) | AIBN | 78-67-1 | 0.65 |

Photo-Initiated Ion Exchange Membranes—Single Photopolymerization Initiator Photo-initiated ion exchange membranes were prepared as described above with respect to the thermally initiated ion exchange membranes, except the thermal initiator was replaced with a single photopolymerization initiator at 2% w/w. Specifically, a sample of 50 g of the formulations of Tables 3 and 4 were combined with 1.0 g of 2-hydroxy-2-methylpropiophenone (Darocur® 1173, distributed by BASF, Ludwigshafen, Germany). The mixture was stirred well at least for 1 hour to allow complete dissolution of the photopolymerization initiator.

Photo-Initiated Ion Exchange Membranes—Multiple Photopolymerization Initiators

Photo-initiated ion exchange membranes were prepared as described above with respect to the single initiator photopolymerization initiated ion exchange membranes, except containing multiple photopolymerization initiators at a total concentration of 2% w/w. Specifically, the charged monomer solution included 2 parts by weight 1-hydroxy-cyclohexyl phenyl ketone, (Irgacure® 184, distributed by Ciba® Specialty Chemicals, Basel, Switzerland) and 1 part by weight of phenyl bis(2,4,6-trimethylbenzoyl) phosphine oxide (BAPO) (Irgacure® 819, distributed by Ciba® Specialty Chemicals).

Initial tests carried out without a film on top of the substrate during exposure to UV-light gave a soft polymer probably of low molecular weight and of incomplete conversion. This was a consequence of the action of oxygen. Oxygen acts as an inhibitor and prevents achievement of high conversions. Thus, it was decided that during experimentation a film would be used to cover the top surface of the substrate.

Figure 9A:
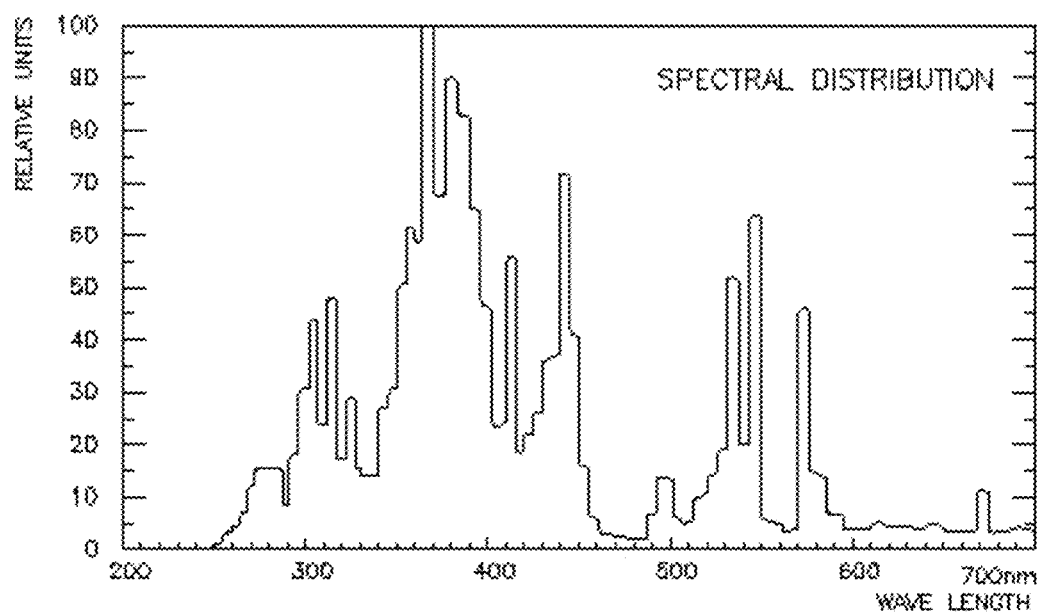
FIG. 9A is a graph of the spectral distribution of light emitted by the ultraviolet lamp.
Figure 9B:
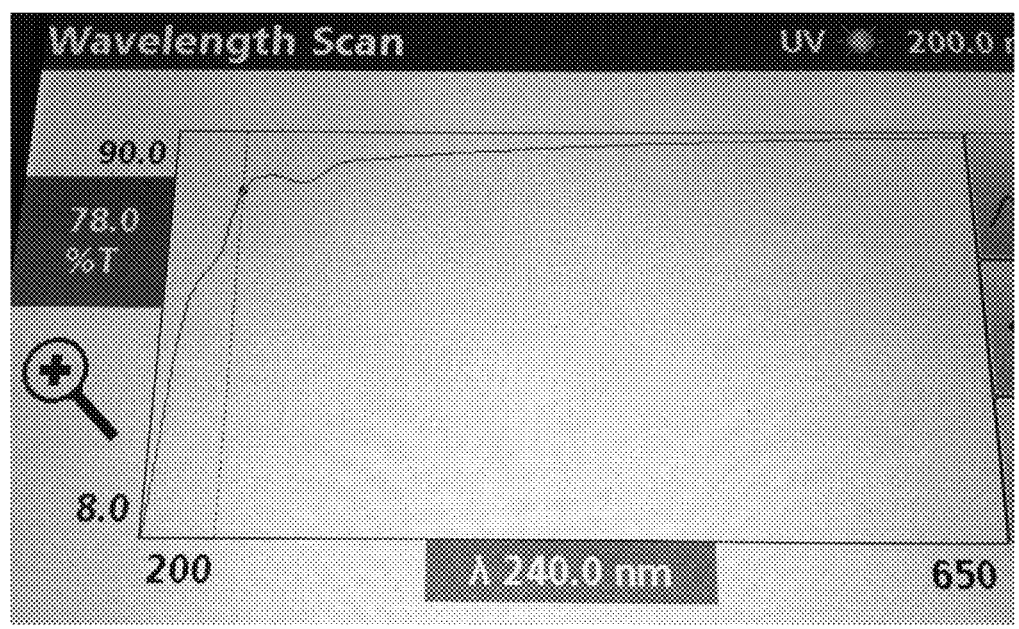
FIG. 9B is a photograph of a graph of the light transmission of the polyethylene.
Figure 9B:
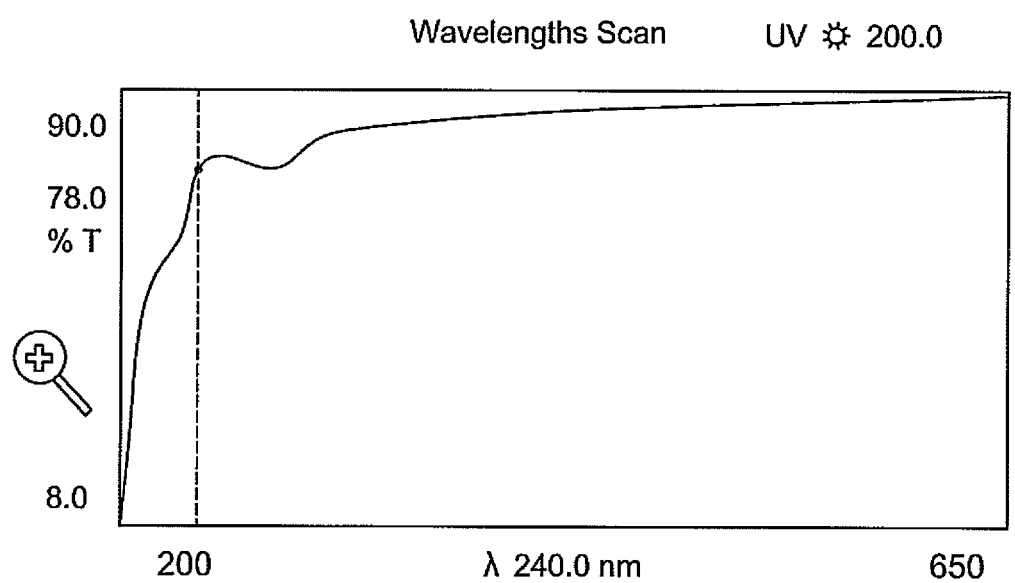

The substrate Teklon® (distributed by Entek, Newcastle upon Tyne, United Kingdom), having a thickness of 20 µm, was placed and allowed to soak in the charged monomer solution for 5 minutes until the substrate was completely saturated. The saturated substrate was removed and placed flat on a piece of mylar. A piece of polyethylene was placed on top of the substrate, and a roller was used to expel the excess solution and air bubbles. The substrate positioned between mylar and polyethylene was transferred to the curing area and exposed to UV light. A sheet of polyethylene as used in plastic (Zip Lock®) bags transmissive to UV light was used. The light transmission of the polyethylene is indicated by its spectrum shown in the graphs of FIGS. 9A-9B.

Only the top side of the substrate was exposed to UV light. The substrate was exposed for a predetermined amount of time, which was varied for the experiment. The shutter system was placed at a distance of 1 inch from the curing surface. All membranes, anion and cation, were prepared in a similar way varying only the time of sample exposure.

The ion exchange membranes prepared with varying UV exposure times were tested for permselectivity and resistance.

The results for the anion exchange membrane preparations are summarized in Table 5.

TABLE 5

Results from Testing of Anion Exchange Membrane

| Number | Membrane | Exposure time, (secs) | Resistance, Ohm | Permselectivity |
|---|---|---|---|---|
| Photoinitiator: 2-Hydroxy-2-methylpropiophenone | | | | |
| Top layer film: Polyethylene | | | | |
| 1 | AEM | 30 | 0.4 | 91.70 |
| 2 | AEM | 30 | 0.7 | 91.90 |
| 3 | AEM | 20 | 0.5 | 89.56 |
| 4 | AEM | 15 | 0.6 | 72.12 |
| Top layer film: Polyethylene | | | | |
| 5 | AEM | 30 | 0.7 | 92.60 |
| 6 | AEM | 20 | 0.4 | 82.71 |
| 7 | AEM | 15 | 0.4 | 70.93 |
| Photoinitiator: Mixture 2/1 of | | | | |
| 1-Hydroxycyclohexyl phenylketone and | | | | |
| Phenyl-bis(2,4,6-trimethylbenzoyl)phosphine oxide | | | | |
| Top layer film: Polyethylene | | | | |
| 8 | AEM | 15 | 0.5 | 91.09 |
| 9 | AEM | 10 | 0.5 | 76.79 |
| Top layer film: Polyethylene | | | | |
| 10 | AEM | 15 | 0.5 | 84.68 |
| 11 | AEM | 20 | 0.5 | 91.20 |

The results show that the anion exchange membrane polymerized with a single photoinitiator and a mixture of initiators yielded the best results when exposure time was 30 seconds. The permselectivity values were 92%-94%, and resistance values were acceptable. At 20 seconds of exposure, the mixed initiator permselectivity was 91.20%.

The results for the cation exchange membrane preparations are summarized in Table 6.

TABLE 6

Results from Testing of Cation Exchange Membrane

| Number | Membrane | Exposure time, (secs) | Resistance, Ohm | Permselectivity |
|---|---|---|---|---|
| Photoinitiator: 2-Hydroxy-2-methylpropiophenone | | | | |
| Top layer film: Polyethylene | | | | |
| 1 | CEM | 30 | 1.3 | 102.41 |
| 2 | CEM | 30 | 1.1 | 102.72 |
| 3 | CEM | 20 | 1.4 | 102.71 |
| 4 | CEM | 20 | 1.2 | 102.90 |
| Photoinitiator: Mixture 2/1 of 1-Hydroxycyclohexyl | | | | |
| phenylketone and Phenyl-bis(2,4,6-trimethylbenzoyl)phosphine oxide | | | | |
| Top layer film: Polyethylene | | | | |
| 5 | CEM | 30 | 1.4 | 103.85 |
| 6 | CEM | 30 | 1.2 | 103.72 |
| 7 | CEM | 20 | 1.5 | 103.38 |
| 8 | CEM | 20 | 1.5 | 103.74 |
| Photoinitiator: 2-Hydroxy-2-methylpropiophenone | | | | |
| Top layer film: Polyethylene | | | | |
| 9 | CEM | 15 | 1.4 | 103.08 |
| 10 | CEM | 10 | 1.2 | 103.44 |

The results show that the cation exchange membrane polymerized with a single photoinitiator and a mixture of initiators yielded the best results with an exposure time between 20 and 30 seconds. The ion exchange membranes showed an acceptable level of resistance and a permselectivity of 102%-104%.

It was noted that the formulation including photo-initiator 2-hydroxy-2-methylpropiophenone showed signs of haze and precipitation upon aging for 3 days. The observation suggests the photo-initiator preparation having 2-hydroxy-2-methylpropiophenone should be prepared the same day of consumption or discarded. It is hypothesized that the photo-initiator 2-hydroxy-2-methylpropiophenone reacts slowly with a component or components formulation causing precipitation. However, the preparation containing 1-hydroxycyclohexyl phenylketone, and phenyl-bis(2,4,6-trimethylbenzoyl) phosphine oxide was completely clear after aging for 5 days.

Thus, the results show acceptable properties for the prepared ion exchange membranes. It is expected that certain improvements will yield better results. The improvements include: decreasing the distance between the UV lamp and curing surface; removing the added inhibitor from the solution, which is conventionally added to improve stability during coating with a thermal initiation; increasing the photoinitiator concentration to compensate for possible consumption of radicals by oxygen; modifying the formulation through incorporation of additives such as extra monomers (for example, at a total concentration of greater than 55 wt % or greater than 60 wt %) and chain transfer agents, which may have a synergistic effect on polymerization; and removing the glass filter that currently exists between the lamp and the curing surface to reduce UV attenuation and increase the intensity of the light that reaches the substrate.

The phraseology and terminology used herein is for the purpose of description and should not be regarded as limiting. As used herein, the term "plurality" refers to two or more items or components. The terms "comprising,"

"including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A method of producing an ion exchange membrane support, comprising:
    saturating a polymeric microporous substrate having a thickness between 25 μm and 55 μm with a charged monomer solution comprising at least one functional monomer, a cross-linking agent, and an effective amount of at least one photopolymerization initiator;
    polymerizing the at least one functional monomer by exposing the saturated polymeric microporous substrate to ultraviolet light in a substantially oxygen free environment at room temperature for an amount of time effective to cross-link the at least one functional monomer and produce the ion exchange membrane support; and
    controlling temperature during the polymerization by pulsating the ultraviolet light to maintain a temperature less than 30° C.

2. The method of claim 1, wherein the at least one photopolymerization initiator comprises at least one of 1-hydroxy-cyclohexyl phenyl ketone, phenyl bis(2,4,6-trimethylbenzoyl) phosphine oxide, bis-acylphosphinoxide, 2-hydroxy-2-methylpropiophenone, 2,2'-azobisisobutyronitrile, and 2,2-dimethoxy-2-phenyl-acetophene.

3. The method of claim 2, wherein the effective amount is between about 2% w/w and 5% w/w.

4. The method of claim 2, wherein the effective amount is about 2% w/w and the amount of time effective to cross-link the at least one functional monomer is between about 20 seconds and about 30 seconds.

5. The method of claim 1, comprising producing a cation exchange membrane support, wherein the at least one functional monomer comprises at least one of 2-sulfoethylmethacrylate (2-SEM), 2-acrylamide-2-methyl propane sulfonic acid (AMPS), sulfonated glycidylmethacrylate, 3-sulfopropyl methacrylate, sodium 1-allyloxy-2 hydroxypropyl sulfonate, acrylic and methacrylic acid or their salts, sodium styrene sulfonate, styrene sulfonic acid, sulfonated vinylbenzyl chloride sodium 1-allyloxy-2 hydroxypropyl sulfonate, 4-Vinylbenzoic acid, Trichloroacrylic acid, vinyl phosphoric acid, and vinyl sulfonic acid.

6. The method of claim 1, comprising producing an anion exchange membrane support, wherein the at least one functional monomer comprises at least one of methacrylamidopropyltrimethyl ammonium chloride; trimethylammoniumethylmethacrylate; quaternary salts of polyamines and vinylaromatic halides; quaternary salts formed by reacting cyclic ethers, polyamines, and alkyl halides; vinylbenyltrimethylammonium chloride; trimethylammoniumethylmethacrylic chloride; 3-(acrylamidopropyl) trimethylammonium chloride; N,N,N',N',N"-pentamethyldiethylenetriamine di(vinylbenzyl chloride); Glycidyl methacrylate/trimethylamine; and Glycidyl methacrylate/N, N-dimethylethylenediamine reaction product.

7. The method of claim 1, further comprising functionalizing an exterior surface of the ion exchange membrane support with a charged compound layer, drying the functionalized ion exchange membrane support, and soaking the functionalized ion exchange membrane support in a solution comprising an acid or a base for an amount of time effective to produce a monovalent selective ion exchange membrane.

8. The method of claim 1, wherein the ion exchange membrane has a permselectivity of at least 90% and a resistance of less than 2 Ω-cm$^2$.

9. The method of claim 1, wherein the cross-linking agent comprises at least one of divinyl benzene (DVB) and ethylene glycol dimethacrylate (EGDM).

10. A method of producing an ion exchange membrane support, comprising:
    saturating a polymeric microporous substrate with a charged monomer solution comprising at least one functional monomer, a cross-linking agent, and an effective amount of at least one photopolymerization initiator, the charged monomer solution being formulated to produce a substantially transparent saturated polymeric microporous substrate; and
    polymerizing the at least one functional monomer by exposing the saturated polymeric microporous substrate to ultraviolet light having a wavelength effective to photoinitiate the at least one photopolymerization initiator, in a substantially oxygen free environment at an intensity effective to penetrate the substrate and for an amount of time effective to cross-link the at least one functional monomer and produce the ion exchange membrane support, wherein the polymerization is performed at room temperature, the method comprising pulsating the ultraviolet light to maintain a temperature less than 30° C.

11. The method of claim 10, comprising exposing the saturated polymeric microporous substrate to ultraviolet light having an intensity between about 2000 mW/cm$^2$ and about 2200 mW/cm$^2$ for an amount of time between about 1 second and about 5 seconds.

12. The method of claim 10, comprising exposing the saturated polymeric microporous substrate to ultraviolet light having an intensity between about 200 mW/cm$^2$ and about 500 mW/cm$^2$ for an amount of time between about 20 seconds and about 30 seconds.

13. The method of claim 10, comprising exposing the saturated polymeric microporous substrate to ultraviolet light having an intensity between about 500 mW/cm$^2$ and about 2000 mW/cm$^2$ for an amount of time between about 5 seconds and about 20 seconds.

14. The method of claim 10, comprising exposing the saturated polymeric microporous substrate to ultraviolet light on a top and bottom surface.

15. The method of claim 14, comprising exposing the saturated polymeric microporous substrate to ultraviolet light having an intensity between about 200 mW/cm$^2$ and about 500 mW/cm$^2$ on each of the top and bottom surface.

16. The method of claim 10, comprising exposing the saturated polymeric microporous substrate to ultraviolet light having an intensity between about 2000 mW/cm$^2$ and about 2200 mW/cm$^2$.

17. The method of claim 10, wherein the at least one photopolymerization initiator comprises at least one of 1-hydroxy-cyclohexyl phenyl ketone, phenyl bis(2,4,6-trimethylbenzoyl) phosphine oxide, bis-acylphosphinoxide, 2-hydroxy-2-methylpropiophenone, 2,2'-azobisisobutyronitrile, and 2,2-dimethoxy-2-phenyl-acetophene.

18. The method of claim 10, wherein the wavelength effective to photoinitiate the at least one photopolymerization initiator is between about 245 nm and about 420 nm.

19. The method of claim 17, wherein the charged monomer solution comprises at least two photopolymerization initiators, and at least two of the photopolymerization initiators are configured to photoinitiate at different wavelengths.

20. The method of claim 19, wherein the method comprises exposing the saturated polymeric microporous substrate to a first ultraviolet light having a first wavelength effective to photoinitiate a first photopolymerization initiator and a second ultraviolet light having a second wavelength effective to photoinitiate a second photopolymerization initiator.

21. A method of producing a monovalent selective ion exchange membrane, comprising:
saturating a polymeric microporous substrate having a thickness between 25 μm and 55 μm with a charged monomer solution comprising at least one functional monomer, a cross-linking agent, and an effective amount of at least one photopolymerization initiator;
polymerizing the at least one functional monomer by exposing the saturated polymeric microporous substrate to ultraviolet light in a substantially oxygen free environment at room temperature for an amount of time effective to cross-link the at least one functional monomer and produce an ion exchange membrane support;
controlling temperature during the polymerization by pulsating the ultraviolet light to maintain a temperature less than 30° C.;
functionalizing an exterior surface of the ion exchange membrane support with a charged compound layer;
drying the functionalized ion exchange membrane support; and
soaking the functionalized ion exchange membrane support in a solution comprising an acid or a base for an amount of time effective to produce the monovalent selective ion exchange membrane.

22. The method of claim 21, comprising soaking the functionalized ion exchange membrane support in a solution comprising 1N NaOH for about 15 minutes.

23. The method of claim 21, further comprising rinsing the monovalent selective ion exchange membrane with water and conditioning the monovalent selective ion exchange membrane in a solution comprising 0.5M NaCl.

24. The method of claim 1, wherein pulsating the ultraviolet light comprises pulsating the ultraviolet light upon detection of a temperature above 30° C. and applying the ultraviolet light continuously upon detection of a temperature below 30° C.

25. The method of claim 10, wherein pulsating the ultraviolet light comprises pulsating the ultraviolet light upon detection of a temperature above 30° C. and applying the ultraviolet light continuously upon detection of a temperature below 30° C.

26. The method of claim 20, wherein the first wavelength is between 245 nm and 300 nm and the second wavelength is between 300 nm and 420 nm.

27. The method of claim 1, wherein the charged monomer solution comprises at least two photopolymerization initiators, the method comprising exposing the saturated polymeric microporous substrate to a first ultraviolet light having a first wavelength between 245 nm and 300 nm effective to photoinitiate a first photopolymerization initiator and a second ultraviolet light having a second wavelength between 300 nm and 420 nm effective to photoinitiate a second photopolymerization initiator.

* * * * *